(12) United States Patent
Melodia et al.

(10) Patent No.: US 11,240,137 B2
(45) Date of Patent: Feb. 1, 2022

(54) DISTRIBUTED WIRELESS NETWORK OPERATING SYSTEM

(71) Applicant: Northeastern University, Boston, MA (US)

(72) Inventors: Tommaso Melodia, Newton, MA (US); Zhangyu Guan, Chestnut Hill, MA (US)

(73) Assignee: Northeastern University, Boston, MA (US)

( * ) Notice: Subject to any disclaimer, the term of this patent is extended or adjusted under 35 U.S.C. 154(b) by 0 days.

(21) Appl. No.: 16/764,229

(22) PCT Filed: Nov. 29, 2018

(86) PCT No.: PCT/US2018/063024
§ 371 (c)(1),
(2) Date: May 14, 2020

(87) PCT Pub. No.: WO2019/108769
PCT Pub. Date: Jun. 6, 2019

(65) Prior Publication Data
US 2020/0280504 A1    Sep. 3, 2020

Related U.S. Application Data

(60) Provisional application No. 62/593,152, filed on Nov. 30, 2017.

(51) Int. Cl.
*H04L 12/26* (2006.01)
*H04B 17/309* (2015.01)
(Continued)

(52) U.S. Cl.
CPC .......... *H04L 43/14* (2013.01); *H04B 17/309* (2015.01); *H04B 17/373* (2015.01);
(Continued)

(58) Field of Classification Search
CPC ............... H04B 17/309; H04B 17/373; H04B 17/3912; H04B 17/30; H04L 43/14;
(Continued)

(56) References Cited

U.S. PATENT DOCUMENTS 7,263,496 B1 *  8/2007  Weigelt .................. G06Q 10/06
                                                705/7.25
8,844,041 B1 *  9/2014  Kienzle ................... H04L 45/02
                                                726/25
(Continued)

OTHER PUBLICATIONS

Hakiri et al., "Software-Defined Netorking: Challenges and research opportunities for Future Internet", Oct. 19, 2014 (Oct. 19, 2014); Computer Networks 75 (2014) 453-471 doi: 10.1016/j.comnet.2014.10.015.

(Continued)

*Primary Examiner* — Jenee Holland
(74) *Attorney, Agent, or Firm* — Verrill Dana, LLP

(57) ABSTRACT

A wireless network operating system for communication between a plurality of nodes of a network is provided. The operating system can enable an operator to define a centralized network control problem at a high level, decompose automatically the network control problem into a set of distributed subproblems, each subproblem characterizing a local behavior of a single session or a subset of sessions or a single node or a subset of nodes or a single protocol layer or a subset of protocol layers, to generate in an automated manner a set of solution algorithms, and send the set of solution algorithms to each node for execution at an associated node controller to optimize the parameters of a programmable protocol stack based on local state information at each node. A network device for use at a node in a wireless network, a method of wirelessly communicating (Continued)

between a plurality of nodes in a network, and a method of providing a wireless network operating system are also provided.

19 Claims, 16 Drawing Sheets

(51) Int. Cl.
*H04B 17/373* (2015.01)
*H04B 17/391* (2015.01)
*H04W 16/18* (2009.01)
*H04W 40/02* (2009.01)
*H04W 24/02* (2009.01)

(52) U.S. Cl.
CPC ..... *H04B 17/3912* (2015.01); *H04L 43/0805* (2013.01); *H04L 43/0823* (2013.01); *H04L 43/0876* (2013.01); *H04W 16/18* (2013.01)

(58) Field of Classification Search
CPC . H04L 43/0823; H04L 43/0876; H04L 43/08; H04L 43/0805; H04W 16/18
See application file for complete search history.

(56) References Cited

U.S. PATENT DOCUMENTS

| | | | | |
|---|---|---|---|---|
| 2005/0007997 | A1* | 1/2005 | Morton | H04L 45/44 370/351 |
| 2007/0011437 | A1* | 1/2007 | Carnahan | G06F 9/4494 712/200 |
| 2007/0111757 | A1* | 5/2007 | Cao | H04W 52/343 455/561 |
| 2008/0144562 | A1* | 6/2008 | Draper | H04B 7/15592 370/315 |
| 2008/0165703 | A1* | 7/2008 | Deng | H04L 45/50 370/254 |
| 2008/0219268 | A1* | 9/2008 | Dennison | H04L 45/22 370/395.2 |
| 2009/0099995 | A1* | 4/2009 | Tzeng | H04L 67/22 706/50 |
| 2009/0112784 | A1* | 4/2009 | Brun | G06F 9/5066 706/46 |
| 2009/0129316 | A1 | 5/2009 | Ramanathan et al. | |
| 2010/0192013 | A1* | 7/2010 | Krishnan | H04L 41/065 714/26 |
| 2010/0271989 | A1* | 10/2010 | Chernoguzov | H04L 12/40176 370/310 |
| 2011/0205929 | A1* | 8/2011 | Quek | H04W 52/367 370/252 |
| 2012/0005251 | A1* | 1/2012 | Xie | H04L 67/288 709/201 |
| 2015/0195126 | A1* | 7/2015 | Vasseur | H04L 45/02 370/218 |
| 2016/0156513 | A1 | 6/2016 | Zhang et al. | |
| 2016/0156733 | A1* | 6/2016 | Farhadi | H04L 67/2842 709/213 |
| 2016/0191306 | A1 | 6/2016 | Gasparakis et al. | |
| 2016/0219024 | A1 | 7/2016 | Verzun et al. | |

OTHER PUBLICATIONS

Guan et al., "WNOS: An Optimization-based Wireless Network Operating System", Dec. 22, 2017 (Dec. 22, 2017); Association for Computing Machinery, 18 pages.
Ding et al., "Distributed resource allocation in cognitive and cooperative ad hoc networks through joint routing, relay selection and spectrum allocation", Computer Networks 83 (2015) 315-331 doi.org/10.1016/j.comnet.2015.02.027.
M. Abolhasan, J. Lipman, W. Ni, and B. Hagelstein, "Software-Defined Wireless Networking: Centralized, Distributed, or Hybrid?," IEEE Network, vol. 29, pp. 32-38, Jul./Aug. 2015.
M. Bansal, J. Mehlman, S. Katti, and P. Levis, "OpenRadio: A Programmable Wireless Dataplane," in Proc. of HotSDN, Helsinki, Finland, Aug. 2012.
A. Gudipati, D. Perry, L. E. Li, and S. Katti, "SoftRAN: Software Defined Radio Access Network," in Proc of HotSDN, Hong Kong, China, Aug. 2013.
X. Jin, L. E. Li, , and J. Rexford, "CellSDN: Software-Defined Cellular Networks," Technical Report, 2012. Online Available. ftp://ftp.cs.princeton.edu/techreports/2012/922.pdf.
E. Demirors, G. Sklivanitis, T. Melodia, and S. Batalama, "RcUBe: Real-Time Reconfigurable Radio Framework with Self-Optimization Capabilities," in Proc. of IEEE SECON, Seattle, WA, Jun. 2015.
M. Zhu, J. Cao, D. Pang, Z. He, and M. Xu, "SDN-Based Routing for Efficient Message Propagation in VANET," in Wireless Algorithms, Systems, and Applications (K. Xu and H. Zhu, eds.), pp. 788-797, New York City, USA: Springer International Publishing, 2015.
L. Galluccio, S. Milardo, G. Morabito, and S. Palazzo, "SDN-WISE: Design, prototyping and experimentation of a stateful SDN solution for Wireless SEnsor networks," in Proc. IEEE INFOCOM, Hong Kong, Apr. 2015.
M. ZImmerling, F. Ferrari, L. Mottola, T. Voigt, and L. Thiele, "pTUNES: Runtime Parameter Adaptation for Low-power MAC Protocols," in Proc. ACM/IEEE International Conference on Information Processing in Sensor Networks (IPSN), Beijing, China, Apr. 2012.
T. Luo, H.-P. Tan, and T. Q. S. Quek, "Sensor OpenFlow: Enabling Software-Defined Wireless Sensor Networks," IEEE Communications Letters, vol. 16, pp. 1896-1899, Nov. 2012.
S. Vissicchio, O. Tilmans, L. Vanbever, and J. Rexford, "Central Control Over Distributed Routing," in Proc. of ACM SIGCOMM, London, United Kingdom, Aug. 2015.
M. Chiang, "Balancing Transport and Physical Layers in Wireless Multihop Networks: Jointly Optimal Congestion Control and Power Control," IEEE JSAC, vol. 23, pp. 104-116, Jan. 2005.
R. H. Byrd, M. E. Hribar, and J. Nocedal, "An Interior Point Algorithm for Large-Scale Nonlinear Programming," SIAM Journal on Optimization, vol. 9, No. 4, pp. 877-900, 1999.
R. H. Byrd, J. C. Gilbert, and J. Nocedal, "A Trust Region Method Based on Interior Point Techniques for Nonlinear Programming," Mathematical Programming, vol. 89, No. 1, pp. 149-185, 2000.

* cited by examiner

```
# Network setting
net = new_ntwk(adhoc)
net.add_node()
net.add_sess()
net.set_protocol(CDMA)
net.set_protocol(TCP_VEGAS)

# Define network utility
net.make_var('wos_x', [netses, sesrate], [all, None])
expr = mkexpr('sum(wos_x)', 'wos_x')
net.set_utlt(expr)
```
→ User-defined network utility

```
# Define network constraints
net.make_var('wos_y', [netlnk, lnkses, sesrate], [every, all, None])
net.make_var('wos_z', [netlnk, lnkcap], [every, None])
cstr = mkexpr('sum(wos_y) <= wos_z', 'wos_y', 'wos_z')
net.add_cstr(cstr)
```
→ Network constraints

```
# Network control problem decomposition
net.dcmp('dual', 'dpl')
```
→ Dual-based cross-layer decomposition
Distributed decomposition using DPL

FIG. 8

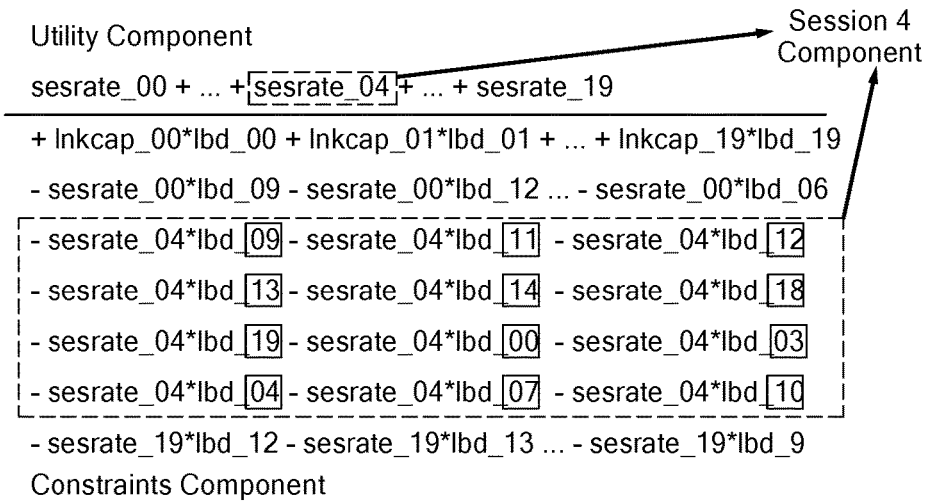

FIG. 9

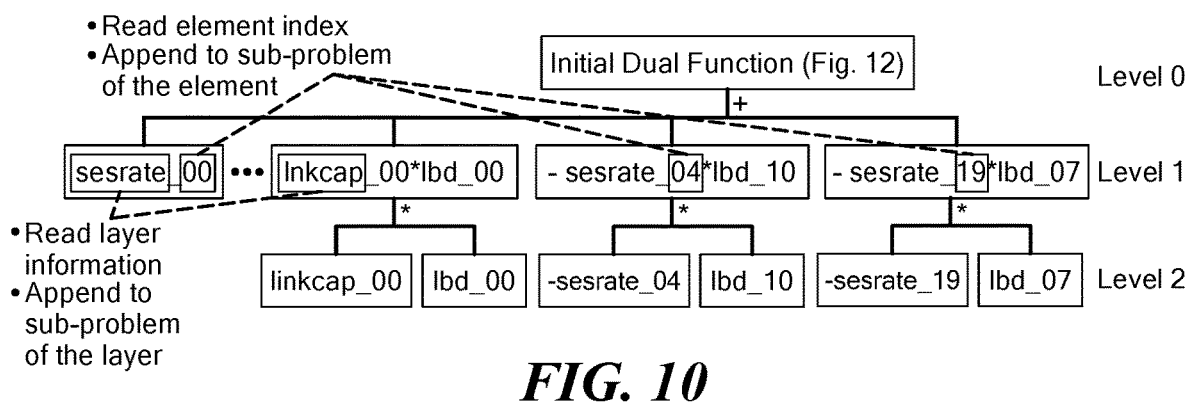

FIG. 10

| Link | Session Instances |
|---|---|
| <u>0</u> | 3, [4], 6, 7, 8, 14, 15, 17, 18, 19 |
| 1 | 0, 2, 3, 6, 8, 10, 11, 12, 16, 17 |
| 2 | 0, 5, 6, 7, 11, 13, 14, 15, 18, 19 |
| <u>3</u> | 0, 1, [4], 6, 10, 11, 13, 16, 17, 19 |
| <u>4</u> | 0, 3, [4], 7, 8, 12, 13, 14, 18, 19 |
| 5 | 1, 3, 6, 10, 11, 12, 13, 15, 18, 19 |
| 6 | 0, 1, 3, 5, 6, 7, 11, 14, 15, 16 |
| <u>7</u> | 1, 3, [4], 6, 12, 14, 15, 16, 17, 19 |
| 8 | 1, 2, 5, 6, 7, 8, 9, 10, 12, 14 |
| <u>9</u> | 0, 2, 3, [4], 5, 12, 13, 15, 16, 17 |
| <u>10</u> | 0, 1, [4], 6, 7, 8, 9, 11, 16, 19 |
| <u>11</u> | [4], 5, 6, 7, 14, 15, 16, 17, 18, 19 |
| <u>12</u> | 2, 3, [4], 6, 7, 8, 12, 15, 17, 18 |
| <u>13</u> | [4], 6, 8, 13, 14, 15, 16, 17, 18, 19 |
| <u>14</u> | 0, 1, 3, [4], 5, 6, 8, 12, 16, 17 |
| 15 | 2, 3, 6, 10, 11, 12, 13, 15, 16, 19 |
| 16 | 1, 2, 3, 5, 6, 8, 9, 12, 15, 16 |
| 17 | 1, 2, 7, 8, 12, 13, 14, 16, 18, 19 |
| <u>18</u> | 0, 1, 3, [4], 6, 7, 12, 13, 18, 19 |
| <u>19</u> | 0, 2, [4], 5, 8, 12, 14, 15, 16, 17 |

Table 1: Instantiation of virtual element *Sessions of Link*, i.e., *lkses* in Fig. 8, $s : l \in L(s)$ in Equation (12). The set of all links is initiated to {1, ..., 19}. Underlined links are links used by session 4.

FIG. 17

DISTRIBUTED WIRELESS NETWORK OPERATING SYSTEM

CROSS REFERENCE TO RELATED APPLICATIONS

This application claims priority under 35 U.S.C. § 119(e) of U.S. Provisional Application No. 62/593,152, filed on Nov. 30, 2017, entitled "WNOS: An Optimization-Based Wireless Network Operating System," the disclosure of which is hereby incorporated by reference.

STATEMENT REGARDING FEDERALLY SPONSORED RESEARCH OR DEVELOPMENT

This invention was made with government support under Grant Numbers N00014-11-1-0848 and N00014-16-1-2213 awarded by the Office of Naval Research (ONR). The Government has certain rights in the invention.

BACKGROUND

Software-defined networking has been used to enhance the performance of infrastructure-based wireless access networks, for example, by improving network resource utilization efficiency, simplifying network management, reducing operating costs, and promoting innovation and evolution. For example, Bansal et al. proposed OpenRadio, which provides a programmable wireless network data plane to enable users/controllers to upgrade and optimize the network in a software-defined fashion. Demirors et al. proposed RcUBe a new architectural radio framework to provide a programmable protocol stack and to ease the implementation of protocols in a cross-layer fashion. Gudipati et al. presented SoftRAN to redesign the radio access layer of LTE cellular networks. Li et al. presented CellSDN to simplify the design and management of wireless cellular networks while enabling new applications.

In contrast to such infrastructure-based cellular networks, software-defined wireless networks without an infrastructure (i.e., ad hoc, multi-hop ad hoc networks, sensor networks, device-to-device networks, vehicular networks, among others) in which at least a portion of the control process needs to be distributed, are more challenging, because of the absence of a centralized control entity.

Zhu et al. proposed an SDN-based routing scheme for Vehicular Ad Hoc Network (VANET) where a central controller collects network information from switches and computes the optimal routing strategies. Palazzo et al. proposed SDN-WISE to provide a stateful programmable protocol stack for wireless sensor networks (WSNs). Zimmerling et al. proposed pTunes, a framework for runtime adaptation of low-power MAC protocol parameters in wireless ad hoc networks, where a central base station is used to collect reports on the network state and then determines optimal MAC layer operating point by solving a multi-objective optimization problem. A software-defined wireless sensor network has been proposed in which node behaviors can be redefined at runtime by injecting of sensor node roles via wireless communications. Luo et al. proposed Sensor OpenFlow (SOF) as a communication interface between the data and control plane of their designed software-defined WSNs (SD-WSN). Since most of these research efforts rely on a logically-centralized control plane to determine the optimal operating point, the resulting software-defined WSNs suffer in terms of flexibility and scalability because of the significant communication overhead and delay in collecting global network state information. For this reason, Vissicchio et al. proposed Fibbing to achieve flexibility and robustness through central control over distributed routing in wireless sensor networks. Abolhasan et al. discussed a hybrid SDN architecture for wireless distributed networks to eliminate the need for multi-hop flooding of routing information. In this way, the computational complexity of route discovery is split between the SDN controller and the distributed forwarding nodes, and consequently the SDN controller does not need to collect all the link state information to decide all routes.

SUMMARY

Embodiments of a wireless network operating system (WNOS) are provided. In contrast to prior art systems, which either rely on an essentially centralized control entity (with limited flexibility and scalability) or focus on a single protocol layer (e.g., the network layer), the present system provides a distributed, cross-layer control of infrastructure-less wireless networks. Embodiments of the WINOS can provide an optimization-based wireless network operating system with distributed cross-layer control programs that can be generated automatically based on rigorous distributed optimization theories while the control objectives are defined on a centralized network abstraction provided by WINOS.

Other aspects of the method and system include the following:

1. A wireless network operating system for communication between a plurality of nodes of a network, the operating system comprising:
   a system control host comprising one or more processors and memory, and machine-readable instructions stored in the memory that, upon execution by the one or more processors cause the system to carry out operations comprising:
   defining a network control problem comprising:
     a characterization of network behavior, the network behavior comprising one or more network control objectives and one or more physical network constraints, and
     one or more network protocols;
   decomposing the network control problem into a set of distributed subproblems, each subproblem characterizing a local behavior of a single session or a subset of sessions or a single node or a subset of nodes or a single protocol layer or a subset of protocol layers, to select a set of solution algorithms; and
   sending the set of solution algorithms wirelessly to each node for execution at an associated node controller based on local state information at each node.

2. The system of embodiment 1, wherein defining the network control problem comprises:
   providing a representation of network elements, the network elements comprising primitive elements and virtual elements, wherein:
     each of the primitive elements comprises an individual determined network entity, and
     each of the virtual elements comprises an undetermined set of network entities mappable to a set of determined primitive elements at runtime; and determining inter-dependencies between the network elements, wherein the inter-dependencies comprise one or more (i) attributes characterizing relationships between the network elements, (ii) member relationships between the network elements, and (iii) functional relationships between the network elements.

3. The system of embodiment 2, wherein determining the inter-dependencies further comprises defining vertices and directed edges of a multigraph of the network elements.

4. The system of any of embodiments 2-3, wherein:
the primitive elements include one or more of a node, link, session, link capacity, and session rate; and
the virtual elements include one or more of neighbors of node, links of session, and sessions of link.

5. The system of any of embodiments 2-4, wherein defining the network control problem comprises performing one or more operations comprising:
setting network parameters of the network elements, wherein the network parameters include one or more of network architecture, spectrum access preferences, and routing preferences;
defining control variables by setting the network parameters as optimization variables;
defining a network utility by binding one or more mathematical expressions with mathematical operations, mathematical functions, or combination thereof; and
defining network constraints by comparing two or more of the mathematical expressions.

6. The system of any of embodiments 2-5, wherein decomposing the network control problem comprises determining a specific instance of the network control problem, the specific instance provided by determining a one-to-one mapping between each virtual element and an instance of each virtual element.

7. The system of embodiment 6, wherein determining the one-to-one mapping comprises peer sampling and hash checking.

8. The system of any of embodiments 6-7, wherein the virtual elements are categorized into global virtual elements and local virtual elements; and
determining the one-to-one mapping comprises:
determining all instances for a same type of local virtual element having a same cardinality, and
determining any sets of local virtual elements having an ordered uniqueness.

9. The system of any of embodiments 6-8, further comprising:
decomposing the specific instance of the network control problem into a set of single-layer subproblems each corresponding to a single protocol layer; and
further decomposing each single-layer subproblem into a set of local network control subproblems for solution at each network entity based on local network information.

10. The system of embodiment 9, wherein decomposing the network control problem into the set of single-layer subproblems comprises employing a cross-layer decomposition approach comprising a dual decomposition algorithm, a primal decomposition algorithm, and an indirect decomposition algorithm, or a combination thereof.

11. The system of any of embodiments 9-10, wherein further decomposing each single-layer subproblem into a set of local network control subproblems comprises determining a penalized utility function for each network entity.

12. The system of any of embodiments 1-11, wherein decomposing the network control problem comprises selecting one or more decomposition approaches, including:
a vertical decomposition, wherein at least a portion of the sub-problems involves a single protocol layer or a subset of protocol layers, and
a horizontal decomposition, wherein at least a portion of the sub-problems involves local functionalities of a single session or a single node device.

13. The system of any of embodiments 1-12, wherein the system control host includes one or more numerical solvers operative to generate the set of solution algorithms to solve each of the sub-problems.

14. The system of embodiment 13, where the numerical solvers include an interior point method, a sequential quadratic programming method, or a trust region reflective method.

15. The system of any of embodiments 1-14, wherein each node comprises one or more processors and memory, a programmable protocol stack stored in the memory, and machine-readable instructions stored in the memory operative to:
receive the set of solution algorithms and store the set of solution algorithms in a decision plane of the programmable protocol stack;
execute the solution algorithms at each protocol layer to optimize a penalized version of local control objectives; and
configure the protocol parameters for the node.

16. The system of embodiment 15, wherein the node is operative to determine the local state information.

17. The system of embodiment 16, wherein the local state information includes one or more of noise level, interference power level, queue status, and available spectrum band.

18. The system of any of embodiments 15-17, further comprising a radio frequency transmitter at each node, the node controller operative to send control commands to the transmitter for transmission of RF signals based on the protocol parameters to other nodes in the network.

19. The system of embodiment 18, wherein the radio frequency transmitter at each node includes a software defined radio or a hardware or firmware wireless interface.

20. The system of any of embodiments 15-19, wherein the programmable protocol stack includes an application layer operative to open sessions between network entities.

21. The system of any of embodiments 15-20, wherein the programmable protocol stack includes programmable parameters comprising one or more of a number of sessions, number of hops in a session, and behavior of a session.

22. The system of any of embodiments 15-21, wherein the programmable protocol stack includes a transport layer operative to implement data transfer between network entities.

23. The system of any of embodiments 15-22, wherein the programmable protocol stack includes programmable parameters comprising one or more of a transmission rate, sliding window size, and packet size.

24. The system of any of embodiments 15-23, wherein the programmable protocol stack includes a network layer operative to provide one or more of host addressing, host identification, and packet routing.

25. The system of any of embodiments 15-24, wherein the programmable protocol stack includes programmable parameters comprising routing strategies.

26. The system of any of embodiments 15-25, wherein the programmable protocol stack includes a datalink layer operative to implement one or more of fragmentation, defragmentation, encapsulation, network to physical address translation, padding, point-to-point frame delivery, logical link control, and medium access control.

27. The system of any of embodiments 15-26, wherein the programmable protocol stack includes programmable parameters comprising one or more of channel coding rate, retransmission times, and packet error rate.

28. The system of any of embodiments 15-27, wherein the programmable protocol stack includes a physical layer operative to implement point-to-point bit-level data transmission.

29. The system of any of embodiments 15-28, wherein the programmable protocol stack includes programmable parameters comprising one or more of a modulation scheme, transmission power, frequency channel, and receiver gain.

30. The system of any of embodiments 1-29, wherein the system control host is operative to push the set of solution algorithms to each node.

31. The system of any of embodiments 1-30, wherein the one or more network control objectives include throughput maximization, energy efficiency maximization, delay minimization, or a combination thereof.

32. The system of any of embodiments 1-31, wherein the one or more physical network constraints include maximum transmission power of each node, available spectrum bandwidth, maximum end-to-end delay, or a combination thereof.

33. The system of any of embodiments 1-32, wherein the network protocols include parameters optimizable in real time, including deterministic scheduling, stochastic scheduling, proactive routing, reactive routing, hybrid routing, delay-based congestion control, packet-loss-based congestion control, or a combination thereof.

34. The system of any of embodiments 1-33, wherein the operations include receiving an input comprising the one or more network control objectives, the one or more physical network constraints, and the one or more network protocol parameters.

35. The system of any of embodiments 1-34, wherein the wireless network comprises one or more of an ad hoc network, a mesh network, a network of sensors, a network of devices, or an internet-of-things network.

36. The system of any of embodiments 1-35, further comprising a radio frequency transmitter at each node.

37. The system of embodiment 36, wherein the radio frequency transmitter includes a software defined radio or a hardware or firmware wireless interface.

38. A method of providing the wireless network operating system of any of embodiments 1-37, comprising:
    providing the system control host;
    providing an input to the system control host comprising the one or more network control objectives, the one or more physical network constraints, and the one or more network protocol parameters.

39. A network device for use at a node in a wireless network, comprising:
    a radio frequency transmitter; and
    a node controller comprising one or more processors and memory, a programmable protocol stack stored in the memory, and machine-readable instructions stored in the memory operative to:
        receive a set of solution algorithms and store the set of solution algorithms in a decision plane of the programmable protocol stack;
        execute the solution algorithms at each protocol layer to optimize a penalized version of local control objectives;
        configure the protocol parameters for the node; and
        send control commands to the radio frequency transmitter for transmission of RF signals based on the protocol parameters to other nodes in the network.

40. The device of embodiment 39, wherein the node controller is operative to determine local state information, including one or more of noise level, interference power level, queue status, and available spectrum band.

41. The device of any of embodiments 39-40, wherein the node controller is operative to send control commands to the radio frequency transmitter for transmission of RF signals based on the protocol parameters to other nodes in the network.

42. The system of any of embodiments 39-41, wherein the radio frequency transmitter includes a software defined radio or a hardware or firmware wireless interface.

43. The system of any of embodiments 39-42, wherein the programmable protocol stack includes an application layer operative to open sessions between network entities.

44. The system of any of embodiments 39-43, wherein the programmable protocol stack includes programmable parameters comprising one or more of a number of sessions, number of hops in a session, and behavior of a session.

45. The system of any of embodiments 39-44, wherein the programmable protocol stack includes a transport layer operative to implement data transfer between network entities.

46. The system of any of embodiments 39-45, wherein the programmable protocol stack includes programmable parameters comprising one or more of a transmission rate, sliding window size, and packet size.

47. The system of any of embodiments 39-46, wherein the programmable protocol stack includes a network layer operative to provide one or more of host addressing, host identification, and packet routing.

48. The system of any of embodiments 39-47, wherein the programmable protocol stack includes programmable parameters comprising routing strategies.

49. The system of any of embodiments 39-48, wherein the programmable protocol stack includes a datalink layer operative to implement one or more of fragmentation, defragmentation, encapsulation, network to physical address translation, padding, point-to-point frame delivery, logical link control, and medium access control.

50. The system of any of embodiments 39-49, wherein the programmable protocol stack includes programmable parameters comprising one or more of channel coding rate, retransmission times, and packet error rate.

51. The system of any of embodiments 39-50, wherein the programmable protocol stack includes a physical layer operative to implement point-to-point bit-level data transmission.

52. The system of any of embodiments 39-51, wherein the programmable protocol stack includes programmable parameters comprising one or more of a modulation scheme, transmission power, frequency channel, and receiver gain.

53. A method of wirelessly communicating between a plurality of nodes in a network, comprising, at a system control host:
    defining a network control problem comprising:
        a characterization of network behavior, the network behavior comprising one or more network control objectives and one or more physical network constraints, and
        one or more network protocols;
    decomposing the network control problem into a set of distributed subproblems, each subproblem characterizing a local behavior of a single session or a subset of sessions or a single node or a subset of nodes or a single protocol layer or a subset of protocol layers, to generate a set of solution algorithms; and sending the set of solution algorithms to each node for execution at an associated node controller based on local state information at each node.

54. The method of embodiment 53, wherein defining the network control problem comprises providing a representation of network elements, the network elements comprising primitive elements and virtual elements, wherein:

each of the primitive elements comprises an individual determined network entity, and each of the virtual elements comprises an undetermined set of network entities mappable to a set of determined primitive elements at runtime; and 55. The method of embodiment 54, further comprising determining inter-dependencies between the network elements, wherein the inter-dependencies comprise one or more (i) attributes characterizing relationships between the network elements, (ii) member relationships between the network elements, and (iii) functional relationships between the network elements.

56. The method of embodiment 55, wherein determining the inter-dependencies further comprises defining vertices and directed edges of a multigraph of the network elements.

57. The method of any of embodiments 54-56, wherein:

the primitive elements include one or more of a node, link, session, link capacity, and session rate; and the virtual elements include one or more of neighbors of node, links of session, and sessions of link.

58. The method of any of embodiments 54-57, wherein defining the network control problem comprises performing one or more operations comprising:

setting network parameters of the network elements, wherein the network parameters include one or more of network architecture, spectrum access preferences, and routing preferences;

defining control variables by setting the network parameters as optimization variables;

defining a network utility by binding one or more mathematical expressions with mathematical operations, mathematical functions, or combination thereof; and defining network constraints by comparing two or more of the mathematical expressions.

59. The method of any of embodiments 54-58, wherein decomposing the network control problem comprises determining a specific instance of the network control problem, the specific instance provided by determining a one-to-one mapping between each virtual element and an instance of each virtual element.

60. The method of embodiment 59, wherein determining the one-to-one mapping comprises peer sampling and hash checking.

61. The method of any of embodiments 59-60, wherein the virtual elements are categorized into global virtual elements and local virtual elements; and determining the one-to-one mapping comprises:

determining all instances for a same type of local virtual element having a same cardinality, and determining any sets of local virtual elements having an ordered uniqueness.

62. The method of any of embodiments 59-61, further comprising:

decomposing the specific instance of the network control problem into a set of single-layer subproblems each corresponding to a single protocol layer; and further decomposing each single-layer subproblem into a set of local network control subproblems for solution at each network entity based on local network information.

63. The method of embodiment 62, wherein decomposing the network control problem into the set of single-layer subproblems comprises employing a cross-layer decomposition approach comprising a dual decomposition algorithm, a primal decomposition algorithm, and an indirect decomposition algorithm, or a combination thereof.

64. The method of any of embodiments 62-63, wherein further decomposing each single-layer subproblem into a set of local network control subproblems comprises determining a penalized utility function for each network entity.

65. The method of any of embodiments 53-64, wherein decomposing the network control problem comprises selecting one or more decomposition approaches, including:

a vertical decomposition, wherein at least a portion of the sub-problems involves a single protocol layer or a subset of protocol layers, and a horizontal decomposition, wherein at least a portion of the sub-problems involves local functionalities of a single session or a single node device.

66. The method of any of embodiments 53-65, further comprising generating the set of solution algorithms to solve each of the sub-problems at one or more numerical solvers.

67. The method of embodiment 66, where the numerical solvers include an interior point method, a sequential quadratic programming method, or a trust region reflective method.

68. The method of any of embodiments 53-67, further comprising, at one or more nodes:

receiving the set of solution algorithms and storing the set of solution algorithms at programmable protocol stack, executing the solution algorithms at each protocol layer to optimize a penalized version of local control objectives, configuring the protocol parameters for the node, and sending control commands to a radio frequency transmitter for transmission of RF signals based on the protocol parameters to other nodes in the network.

69. The method of embodiment 68, further comprising determining the local state information, including one or more of noise level, interference power level, queue status, and available spectrum band.

70. The method of any of embodiments 68-69, wherein the radio frequency transmitter node includes a software defined radio or a hardware or firmware wireless interface.

71. The method of any of embodiments 68-70, wherein the programmable protocol stack includes an application layer operative to open sessions between network entities.

72. The method of any of embodiments 68-71, wherein the programmable protocol stack includes programmable parameters comprising one or more of a number of sessions, number of hops in a session, and behavior of a session.

73. The method of any of embodiments 68-72, wherein the programmable protocol stack includes a transport layer operative to implement data transfer between network entities.

74. The method of any of embodiments 68-73, wherein the programmable protocol stack includes programmable parameters comprising one or more of a transmission rate, sliding window size, and packet size.

75. The method of any of embodiments 68-74, wherein the programmable protocol stack includes a network layer operative to provide one or more of host addressing, host identification, and packet routing.

76. The method of any of embodiments 68-75, wherein the programmable protocol stack includes programmable parameters comprising routing strategies.

77. The method of any of embodiments 68-76, wherein the programmable protocol stack includes a datalink layer operative to implement one or more of fragmentation, defragmentation, encapsulation, network to physical address translation, padding, point-to-point frame delivery, logical link control, and medium access control.

78. The method of any of embodiments 68-77, wherein the programmable protocol stack includes programmable parameters comprising one or more of channel coding rate, retransmission times, and packet error rate.

79. The method of 68-78, wherein the programmable protocol stack includes a physical layer operative to implement point-to-point bit-level data transmission.

80. The method of any of embodiments 68-79, wherein the programmable protocol stack includes programmable parameters comprising one or more of a modulation scheme, transmission power, frequency channel, and receiver gain.

81. The method of any of embodiments 53-80, further comprising pushing the set of solution algorithms to each node.

82. The method of any of embodiments 53-81, further comprising receiving an input comprising the one or more network control objectives, the one or more physical network constraints, and the one or more network protocol parameters.

83. The method of any of embodiments 53-82, wherein the one or more network control objectives include throughput maximization, energy efficiency maximization, delay minimization, or a combination thereof.

84. The method of any of embodiments 53-83, wherein the one or more physical network constraints include maximum transmission power of each node, available spectrum bandwidth, maximum end-to-end delay, or a combination thereof.

85. The method of any of embodiments 53-84, wherein the network protocols include parameters optimizable in real time, including deterministic scheduling, stochastic scheduling, proactive routing, reactive routing, hybrid routing, delay-based congestion control, packet-loss-based congestion control, or a combination thereof.

86. The method of any of embodiments 53-85, further comprising transmitting RF signals from one of the nodes to other nodes in the network.

87. The method of any of embodiments 53-86, wherein the wireless network comprises one or more of an ad hoc network, a mesh network, a network of sensors, a network of devices, or an internet-of-things network.

DESCRIPTION OF THE DRAWINGS

Reference is made to the following detailed description taken in conjunction with the accompanying drawings in which:

FIG. 2A is an illustration of a directed multigraph; FIGS. 2B and 2C are graph examples;

FIG. 8 is an example of a high-level centralized definition of a network control problem based on wireless network operating system;

FIG. 9 is an example of a dual function of the instantiated centralized network control problem of FIG. 8;

FIG. 10 is a tree representation of the instantiated dual function of FIG. 9;

FIG. 17 is a Table illustrating an instantiation result from the example in FIG. 8.

DETAILED DESCRIPTION

Figure 1:
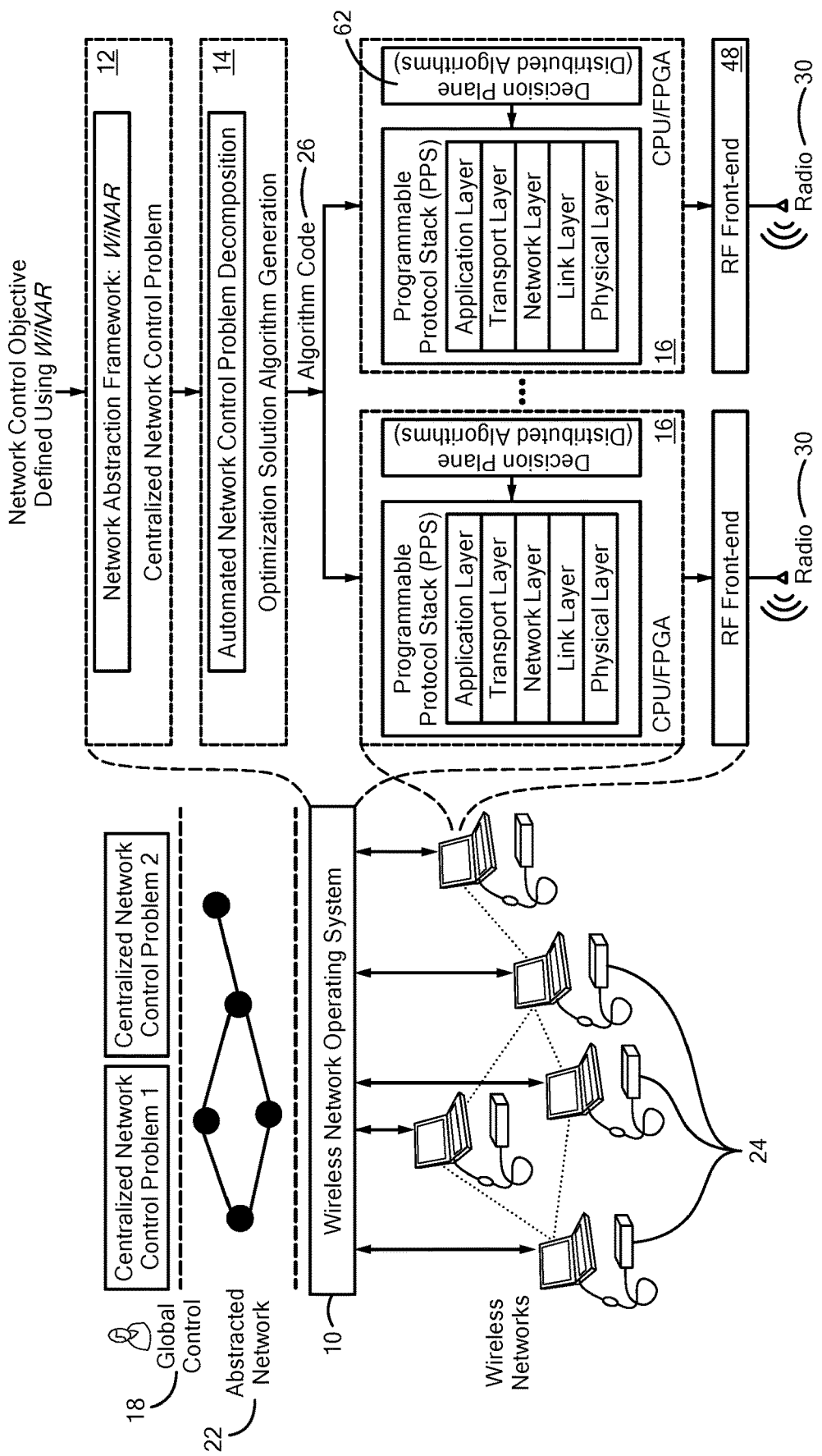
FIG. 1 is a schematic illustration of an embodiment of an architecture of a wireless network operating system.

Applications of software-defined networking (SDN) concepts to infrastructure-less wireless networks are substantially unexplored, mainly because of the complex nature of the distributed control problems and of the unavailability of a high-speed backhaul. The present system and method provide the development of a principled approach to software-defined wireless networking based on cross-layer optimization theory, and to bridging the gap between software defined networking and distributed network optimization.

The system provides basic design principles for embodiments of a wireless network operating system (WINOS), for a new approach to SDN for infrastructure-less wireless networks. Embodiments of the WINOS can provide a network designer with an abstraction hiding (i) the lower-level details of the wireless protocol stack and (ii) the distributed nature of the network operations. Based on this abstract representation, the WINOS can take network control programs written on a centralized, high-level view of the network and automatically generate distributed cross-layer control programs based on distributed optimization theory that are executed by each individual node on an abstract representation of the radio hardware.

1. Introduction

Most existing wireless networks are inherently hardware-based and rely on closed and inflexible architectures that delay adoption of new wireless networking technologies. Moreover, it is very challenging to control large-scale networks of heterogeneous devices with diverse capabilities and hardware. In contrast, software-defined radios provide more flexibility. At the same time, software radios today lack appropriate abstractions to enable implementation of complex networking applications able to leverage the cross-layer interactions that characterize wireless operations. To use an analogy from computer systems, trying to build a complex networked application on software radios is today as hard as trying to build a complex piece of enterprise software by writing bare-metal code in a low-level programming language.

There have been efforts trying to define new networking abstractions. The notion of software defined networking (SDN) has been introduced to simplify network control and to make it easier to introduce and deploy new applications and services as compared to classical hardware-dependent approaches. The main ideas are (i) to separate the data plane from the control plane; and (ii) to "control" the network behavior through a centralized programmatic network abstraction. This simplifies the definition of new network control functionalities, which are now defined based on an abstract and centralized representation of the network.

So far, most SDN work has concentrated on "softwarization" of routing for commercial infrastructure-based wired networks, with some recent work addressing wireless networks. However, applications of software-defined networking concepts to infrastructure-less wireless networks (i.e., tactical ad hoc networks, mesh, sensor networks, D2D, IoT) are substantially unexplored. This is because distributed control problems in wireless networks are complex and hard to separate into basic, isolated functionalities (i.e., layers in traditional networking architectures). Typical control problems in wireless networks involve making resource allocation decisions at multiple layers of the network protocol stack that are inherently and tightly coupled because of the shared wireless radio transmission medium; conversely, in software-defined commercial wired networks, one can concentrate on routing at the network layer in isolation. Moreover, in most current instantiations of this idea, SDN is realized by (i) removing control decisions from the hardware, e.g., switches, (ii) by enabling hardware (e.g., switches, routers) to be remotely programmed through an open and standardized interface, e.g., OpenFlow, and (iii) by relying on a centralized network controller to define the behavior and operation of the network forwarding infrastructure. This unavoidably requires a high-speed backhaul infrastructure to connect the edge nodes with the centralized network controller, which is typically not available in wireless networks where network nodes need to make distributed, optimal, cross-layer control decisions at all layers to maximize the network performance while keeping the network scalable, reliable, and easy to deploy. These problems, which are specific to wireless, cannot be solved with existing SDN approaches.

The wireless SDN approach described herein employs a new approach to software-defined networking for wireless networks. Embodiments of the system are provided that can automatically generate distributed wireless network control programs that are defined based on a centralized abstraction of the network that hides low-level implementation details. Embodiments are provided that can bridge the gap between software defined networking and distributed network optimization/control. Embodiments are provided that can keep the benefits of distributed network control (where decisions are taken close to the network/channel/interference state without the need for collecting information at a centralized decision making point); and at the same time can define the network behavior based on a centralized abstraction. Embodiments can provide a principled approach to software-defined wireless networking based on cross-layer optimization theory.

The system can employ principles of a wireless network operating system (WNOS). The WINOS can provide a network designer with an abstraction hiding the lower-level details of the network operations. Embodiments of the WINOS can hide details of the distributed implementation of the network control operations and can provide the network designer with a centralized view abstracting the network functionalities at a high level. Based on this abstract representation, the WINOS can take centralized network control programs written on a centralized, high-level view of the network and automatically generate distributed cross-layer control programs based on distributed optimization theory that are executed by each individual node on an abstract representation of the radio hardware.

Embodiments of the system can include the following aspects:

WNOS Architecture Design. An architecture for WINOS defined by three key components: network abstraction, automated network control problem decomposition, and programmable protocol stack.

Network Abstraction. A wireless network abstraction framework (WiNAR), analogous to aspects of the language of network utility maximization (NUM), based on which network designers can characterize diverse desired network behaviors before actual deployment.

Automated Decomposition. The notion of disciplined instantiation, based on which user-defined abstract centralized network control problems can be decomposed into a set of distributed subproblems in an automated fashion. Distributed control programs regulate the behavior of each involved node to obtain the desired centralized behavior in the presence of time-varying local conditions (including channel, traffic, etc.).

Unlike traditional SDN, which relies on centralized control (unsuitable for infrastructure-less wireless networks), control behaviors are defined on a centralized network abstraction, while executing the behaviors through automatically generated distributed control programs based on local network state information only. Hence, the user-defined centralized cross-layer network control objective can be achieved with no need to distribute network state at all layers of the protocol stack across the global network, which is undesirable. The resulting WNOS can contribute to bridging the gap between centralized/distributed optimization techniques and software-defined networking; distributed control is not based on design-by-intuition principles, but on rigorous mathematical models based on nonlinear optimization theory.

2. WNOS Architecture

The architecture of the wireless network operating system (WINOS) is illustrated in FIG. 1. At a high level, the WINOS 10 comprises three components: network abstraction 12, network control problem decomposition 14, and programmable protocol stack (PPS) 16.

Network Abstraction.

This is the interface through which a network designer can define the network control problem to achieve certain application-specific objectives. Two functionalities are provided by this component, that is, network behavior characterization and centralized network control problem definition. WINOS can provide the designer with a set of network abstraction APIs through which the designer can characterize at a high-level the desired network behavior. Through the API, the designer can define various network control objectives, such as throughput maximization, energy efficiency maximization, delay minimization, or their combinations; and can impose different constraints on the underlying physical network, such as the maximum transmission power of each node, available spectrum bandwidth, and maximum end-to-end delay, among others. To define a network control problem, the designer does not have to consider all implementation details of the networking protocol stack. In some embodiments, the designer can select different templates of network protocols, which are programmable with parameters that can be optimized in real time, such as deterministic scheduling vs. stochastic scheduling, proactive routing vs. reactive routing vs. hybrid routing, and delay-based vs. packet-loss-based congestion controls, among others. Notably, the network designer does not need to control protocol parameters manually. Instead, the parameters are optimized by WINOS through automatically generated distributed algorithms. These control objectives, network constraints, and selected protocol templates together serve as the input of the network control problem definition 18. Then, given a network control problem defined at a high-level, a mathematical or other representation 22 of the underlying centralized network utility maximization problem can be constructed by parsing the network abstraction functions. Details of the network abstraction design are discussed in Section 3 below.

Network Control Problem Decomposition.

The resulting centralized network control problem, which characterizes the behavior of the wireless network, can then be decomposed into a set of distributed sub-problems, each characterizing the local behavior, e.g., a single session or a single node. To this end, WINOS first determines a decomposition approach based on the mathematical structure of the network control problem, including whether the problem involves one or multiple sessions, what protocol layers are to be optimized, and if the problem is convex or not, among others. Different decomposition approaches can lead to different structures of the resulting distributed control program with various convergence properties, communication overhead, and achievable network performance.

Through vertical decomposition, a centralized network control problem can be decomposed into subproblems each involving a single protocol layer or a subset of protocol layers, while through horizontal decomposition each of the resulting subproblems involves local functionalities of a single session or node device. Different decomposition approaches can be jointly and iteratively applied if the centralized network control problem involves multiple concurrent sessions and cross-layer optimization of multiple protocol layers. For each of the resulting subproblems, a numerical solution algorithm (e.g., interior-point method) can then be selected to solve the problem. Different distributed solution algorithms can interact with each other by updating and passing a common set of optimization variables. See Section 4.2 for details of the decomposition approach.

Programmable Protocol Stack (PPS).

For each of the resulting distributed network control problems, a numerical solution algorithm 26 can be selected to solve the optimization problem. This can be executed in real time and the obtained optimization results used to configure the control parameters of a PPS on each local network device 24 to adapt to the dynamic networking environments. The PPS can provide abstractions and building blocks necessary to prototype complex cross-layer protocols based on a high level, abstract representation of the software radio platform without hiding, and instead while retaining control of, implementation details at all layers of the protocol stack and while maintaining platform independence. The control interface between the PPS and the distributed solution algorithms can be defined so that (i) the solution algorithm can retrieve network status information from the register plane of the PPS, such as noise and interference power level, queue status, and available spectrum band, among others, and then use the retrieved information as input parameters of the distributed optimization problems; and (ii) based on the optimized solutions, the programmable protocol stack is able to configure in an on-line fashion the parameters of the adopted protocol stack via its decision engine in the decision plane, e.g., update the modulation scheme based on the optimized transmission power hence SINR, configure the TCP window size based on the optimized application-layer rate injected into the network.

3. Network Abstraction: WiNAR

An objective of the network abstraction component WiNAR is to provide network designers with an interface to characterize network behaviors at a high and centralized level. This goal is however not easy to accomplish because of the following challenges:

Pre-deployment network abstraction. Unlike traditional network abstraction and resource virtualization, where the objective is to abstract or virtualize networks at one or two protocol layers at run time with fixed network topology and known global network information, in the present case, run-time information is not available in the design phase. For example, the available links that can be used by a session or the neighbors or interferers of a node, among others are not known a priori. Therefore, the challenge is to abstract the wireless network before actual deployment by taking run-time uncertainties at all protocol layers into consideration, including time-varying wireless channels, interference coupling among nodes, and network topology and traffic load variations, among others.

Multi-role network element. A physical network entity may serve in different roles in the network. For example, a node can be the source or destination of a session, the transmitter, relay, or receiver of a link, the neighbor of other nodes, a head of a cluster, or a member of the whole network, among others. The network abstraction needs to allow designers to characterize network element behaviors with respect to heterogeneous roles while controlling the same physical network entity.

To address these challenges, elements in WINOS can be represented following a three-fold abstraction. At the core of the network abstraction there is a network representation layer, which bridges the outer network control interface layer and inner network modeling layer. Through the network control interface layer, the designer can define the network control objective at a high level, and a mathematical representation of the defined centralized network control problem can then be constructed based on the network modeling layer.

Network Representation.

The network abstraction represents different network entities as two categories of network elements, i.e., Primitive Element and Virtual Element, defined as follows.

Definition 3.1 (Primitive Element)

A primitive element is a network element that represents an individual determined network entity. Two criteria need to be satisfied for each primitive element $\mathcal{A}$:
- |{Network entities represented by $\mathcal{A}$}|=1 with |•| being the cardinality of a set, i.e., there exists a one-to-one mapping between any primitive element and a physical network entity.
- For any time instants $t_1 \neq t_2$, $\mathcal{A}(t_1) = \mathcal{A}(t_2)$ always holds, i.e., the one-to-one mapping does not change with time.

Examples of primitive elements include Node, Link, Session, Link Capacity, and Session Rate, among others. (Here, Link Capacity and Session Rate refer to the network parameters rather than any specific values of the parameters that can be time varying.)

Definition 3.2 (Virtual Element)

A virtual element represents an undetermined set of network entities, i.e., cannot be mapped to a deterministic set of primitive elements other than at runtime. A virtual element V satisfies:
- |{Network entities represented by V}|≥1, i.e., each virtual element is mapped to physical network entities in a one-to-many manner.
- V=V(t), i.e., the set of network entities represented by each virtual element is a function of the network run time t.

Examples of virtual element include Neighbors of Node (the set of neighbors of a node), Links of Session (the set of links used by a session), and Sessions of Link (the set of sessions sharing the same link), among others. The members of a virtual element are primitive elements, e.g., each member of virtual element Links of Session is a primitive element Link. Then, a wireless network can be characterized using a set of primitive and virtual network elements as well as the cross-dependency among the elements, which is formalized in Definition 3.3.

Definition 3.3 (Network)

With primitive elements $\mathcal{A}_m$, $\mathcal{A}_m'$ and virtual elements $V_n$, $V_n'$, a network Net can be represented as:

$$\text{Net} = \left\{ \begin{array}{c} \mathcal{A}_m, V_n, I(\mathcal{A}_m, \mathcal{A}_{m'}), I(V_n, V_{n'}), I(\mathcal{A}_m, V_n) \\ m, m' \in \mathcal{M}_A, m \neq m', n, n' \in \mathcal{N}_V, n \neq n' \end{array} \right\} \quad (1)$$

where $\mathcal{M}_A$ and $\mathcal{N}_V$ are the sets of primitive and virtual network elements, respectively, and $I(\mathcal{A}_m, \mathcal{A}_m')$, $I(V_n, V_n')$, $I(\mathcal{A}_m, V_n)$ represent the inter-dependencies between primitive elements $\mathcal{A}_m$ and $\mathcal{A}_m'$, between virtual elements $V_n$ and $V_n'$, and between primitive element $\mathcal{A}_m$ and virtual element $V_n$, respectively.

Figure 2A:
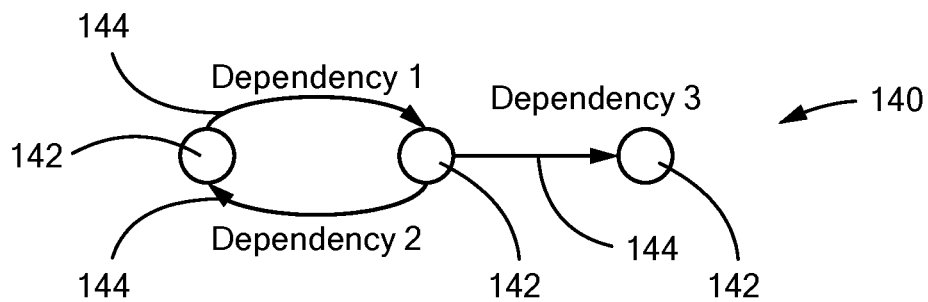
FIGS. 2A, 2B, and 2C are schematic representations of a dependency relationship among network elements based on directed multigraph.
Figure 2B:
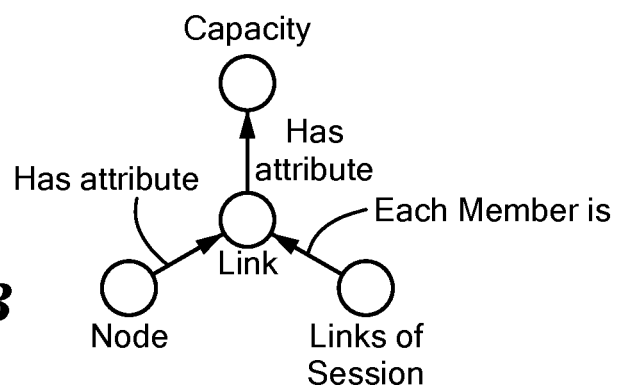
Figure 2C:
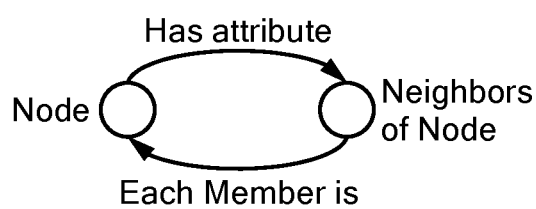

In Definition 3.3, the inter-dependency I(•,•) among different network elements can be characterized as a directed multigraph. As illustrated in FIG. 2A, each vertex 142 of the graph 140 represents a network element, and the relationship between two coupled vertices are characterized using one or multiple directed edges 144 connecting the two vertices. All directed edges together characterize the cross-dependency relationship among the network elements. FIGS. 2B and 2C are two examples of the multigraph-based network element representation. In FIG. 2B, primitive element Link is the holder of another primitive element Capacity (i.e., Link has attribute Capacity). Similarly, Link is an attribute of primitive element Node and is a member of virtual element Links of Session. In FIG. 2C, the mutual relationship between primitive element Node and virtual element Neighbors of Node are characterized using two directed edges (hence a multigraph): Node has an attribute Neighbors of Node, each member of which is a Node.

- Has Attribute characterizes parent-child relationships between network elements, e.g., parent element Link has child elements Link Capacity (lnkcap) and Link Power (lnkpwr) as its attributes.
- Each Member is characterizes set-individual relationships between virtual and primitive elements, e.g., each member of Links of Session (lnkses) is a Link (lnk).
- Is Function of defines the mathematical model of an element based on other elements, e.g., element Link SINR (lnksinr) is a function of Link Power (lnkpwr).

Network Control Interfaces.

Based on the network element representation, network control interfaces can then be designed. Based on these, network designers can characterize network behaviors. Four categories of operations have been defined:
- Read: Extract network information from a single or a group of network elements, e.g., extract the set of links used by a session from the attributes of Node.
- Set: Configure parameters for a single or a group of network elements, e.g., set Maximum Power (i.e., maxpwr), which is also an attribute of element Node.
- Compose: Construct a new expression by mathematically manipulating network parameters obtained through Read operations. For example, add together the power of all links originated from the same node, i.e., sum Link Power (lnkpwr) over Links of Node (lnknd).
- Compare: Define network constraints by comparing two expressions obtained using Compose operations.

Centralized Network Control Problem.

Centralized network control problems can be defined based on the network control interfaces. A network control problem can comprise four components: network setting, control variables, network utility, and network constraints.
- Network Setting can be configured by setting network parameters using Set operations and extracted from network elements using Read operations. Configurable network parameters include network architecture (single- or multi-hop, flat or clustered topology), spectrum access preferences (scheduled or statistical access), and routing preferences (single- or multi-path routing), among others.
- Control Variables can be defined by setting (i.e., Set operation) network parameters as optimization variables, including transmission power, frequency bandwidth, transmission time, source rate, and channel access probability, among others.
- Network Utility can be defined by binding (i.e., Compose operation) one or multiple expressions with mathematical operations like +, −, ×, ÷ and mathematical functions like log, $\sqrt{(\cdot)}$ and their combinations.
- Network Constraints can be defined by comparing two expressions using Compare operations.

Examples of network control problem definition based on the developed abstraction APIs are given in Section 6.

Given the high-level characterization of network behaviors, the underlying mathematical models of the problem can then be constructed by extracting the mathematical models of each network element using the Read operation. The resulting network utility maximization problem is a centralized cross-layer network optimization problem. A goal is to generate, in an automated fashion, distributed control programs that can be executed at individual network devices, which is accomplished by another main component of WINOS, i.e., Network Control Problem Decomposition as described in Section 4.

4. Automated Network Control Problem Decomposition

There is no existing unified decomposition theory in the prior art that can be used to decompose arbitrary network control problems. Depending on whether the need is to decompose coupled network constraints, or coupled radio resource variables; and depending on the decomposition order, a cross-layer network control problem can be theoretically decomposed based on dual decomposition, primal decomposition, indirect decomposition and their combinations. Described herein is an automated network control problem decomposition approach based on decomposition of nonlinear optimization problems.

Objectives of the decomposition are as follows:
Cross-layer Decomposition: Decouple the coupling among multiple protocol layers, resulting in subproblems each involving functionalities handled at a single protocol layer;
Distributed Control Decomposition: Decouple the coupling in radio resource allocation among different network devices, resulting in subproblems that can be solved at each device in a distributed fashion.

First a brief review is provided of cross-layer distributed decomposition theory based on which the present automated decomposition approach is designed.

4.1 Decomposition Approaches

Cross-layer Decomposition.

A duality theory for cross-layer decomposition is considered (while the automated decomposition approach described in Section 4.2 is not limited to any specific decomposition theory). Consider a network control problem expressed as:

$$\underset{x}{\text{maximize}} \sum_{i \in I} f_i(x_i), \quad (2)$$

$$\text{subject to: } \sum_{i \in \mathcal{J}_i} g_i(x_i) \leq c_j, \forall j \in \mathcal{J}$$

with $x = (x_i)_{i \in \mathcal{J}}$ being the control vector. The dual function can be constructed by incorporating the constraints into utility in problem (2) by introducing Lagrangian variables $\lambda = (\lambda_j)_{j \in \mathcal{J}}$, $$\text{maximize } L(x, \lambda) = \sum_{i \in I} f_i(x_i) - \sum_{j \in \mathcal{J}} \lambda_j \left( c_j - \sum_{i \in \mathcal{J}_i} g_i(x_i) \right) \quad (3)$$

where $\mathcal{L}(x,\lambda)$ is called the Lagrangian of problem (2). Then, the original problem (2) can be solved in the dual domain by minimizing (3), i.e., minimizing the maximum of the Lagrangian. This can be accomplished by decomposing (3) into subproblems $$f_{sub\_1} = \underset{x}{\text{maximize}} \sum_{i \in I} f_i(x_i) + \sum_{j \in \mathcal{J}} \lambda_j \left( \sum_{i \in \mathcal{J}_i} g_i(x_i) \right), \quad (4)$$

$$f_{sub\_2} = \underset{\lambda}{\text{maximize}} f_{sub\_1} - \sum_{j \in \mathcal{J}} \lambda_j c_j, \quad (5)$$

and then iteratively maximizing $f_{sub\_1}$ over control variables x with given λ and updating λ with the minimizer of $f_{sub\_2}$.

Distributed Decomposition.

The outcome of cross-layer decomposition is a set of network control subproblems each corresponding to a single protocol layer, e.g., capacity maximization at the physical layer, delay minimization through routing at the network layer, among others. The objective of distributed decomposition is to further decompose each of the resulting single-layer subproblems into a set of local network control problems that can be solved distributively at each single network entity based on local network information.

It is known to accomplish this goal by designing distributed network control algorithms manually for specific network scenarios and control objectives, which, however requires deep expertise in distributed optimization. In contrast, a theoretical framework is presented here, based on which distributed control programs can be designed for arbitrary user-defined network control problems.

A design principle is to decompose a coupled multi-agent network control problem into a set of single-agent subproblems, where each agent optimizes a penalized version of their own utility. Consider a multi-agent network control problem with the objective of $$\text{maximizing } U(x) \triangleq \sum_{i \in \mathcal{J}} U_i(x_i, x_{-i}),$$

where $U_i$ is the utility function of agent $i \in \mathcal{J}$, $x=(x_i, x_{-i})$ with $x_i$ and $x_{-i}$ representing the strategy of agent i and the strategy all other agents in $\mathcal{J}$ /i. Then, the key of distributed decomposition is to construct a penalized individual utility $\tilde{U}_i(x_i, x_{-i})$ for each agent $i \in \mathcal{J}$, expressed as $\tilde{U}_i(x_i, x_{-i}) = \theta_i(U(x)) + \Gamma_i(x)$, where $\theta_i(U(x))$ is the individual item of $U(x)$ associated to agent $i \in \mathcal{J}$, $\Gamma_i(x)$ is the penalization item for agent i. Below are three special cases of $\tilde{U}_i(x_i, x_{-i})$ while both individual and penalization items can be customized by network designers to achieve a trade-off between communication overhead and social optimality of the resulting distributed control programs.

Case 1: $\theta_i(U(x))=f_i(x_i,x_{-i})$, $\Gamma_i(x_i,x_{-i})=0$, i.e., best response without penalization. In this case, the agents optimize their own original utility $U(x_i,x_{-i})$ by computing the best response to the strategies of all other competing agents (i.e., $x_{-i}$) with zero signaling exchanges.

Case 2: $\theta_i(U(x)) = \nabla_{x_i} U_i(x^0)(x_i - x_i^0)$;

$$\Gamma_i(x) = \sum_{j \in \mathcal{J}/i} \nabla_{x_i} U_j(x^0) \cdot (x_i - x_i^0)$$

with $x_i^0$ and $x^0$ being the current strategy of agent i and of all agents. This will result in distributed gradient algorithm, where partial cooperation is allowed among the agents by exchanging appropriate signaling messages.

Case 3: $\theta_i(U(x)) = U_i(x_i, x_{-i}^0)$;

$$\Gamma_i(x) = \sum_{j \in \mathcal{J}/i} \nabla_{x_i} U_j(x^0)$$

which leads to decomposition by partial linearization (DPL), a newly established decomposition result.

4.2 Automated Decomposition

A step in cross-layer decomposition, as discussed in Section 4.1, is to form a dual function for the original user-defined network control problem by absorbing constraints into the utility. Here, an underlying assumption is that the original problem (2) must have a determined set of constraints, i.e., sets $\mathcal{J}$, $\mathcal{J}$ and $\mathcal{J}_i$, $\forall\ i \in \mathcal{J}$ in (2) must be known. This poses significant challenges to automated network control problem decomposition at design phase, because the sets associated to the network elements are not determined other than at run time, i.e., they are virtual elements as defined in Section 3.

Figure 3:
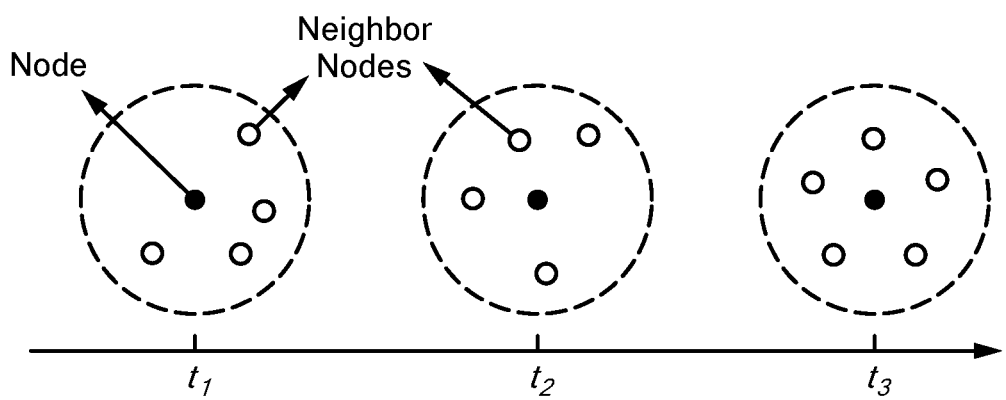
FIG. 3 is a schematic illustration of a time-varying set of neighbor nodes.

Take virtual element nbrnd as an example, i.e., the set of Neighbors of Node. As illustrated in FIG. 3, the neighbors 154 of a node 152 may change from time to time because of movement of nodes, joining of new nodes or leaving of dead nodes. Similarly, the set of links along an end-to-end path, the set of sessions sharing the same link and the set of all active links in the network, among others, are also time varying with no predetermined sets. That is to say, a network control problem defined at a high and abstract level may result in many instances of problems with different sets in the constraints and hence different dual variables $\lambda_j$ in the resulting dual function (3). Therefore, a centralized user-defined network control problem cannot be decomposed by decomposing an arbitrary specific instance of the problem.

Thus, a methodology is presented here to enable network control problem decomposition in an automated fashion at design phase with no need to know run time network information. The following question can be asked: For a user-defined centralized abstract network control problem, are there any special sets of instances of the problem such that decomposing any problems in the special set decomposes all possible instances? If yes, what is the right approach to obtain such problem instances? These questions are answered by proposing the notion of disciplined instantiation (DI).

Disciplined Instantiation.

In a nutshell, the DI technique generates at design time, following certain rules (as discussed below), a specific instance of the user-defined abstract network control problem, such that the abstract problem can be decomposed by decomposing the specific instance and the obtained decomposition results can be applied to those control problems at network run time.

Figure 4:
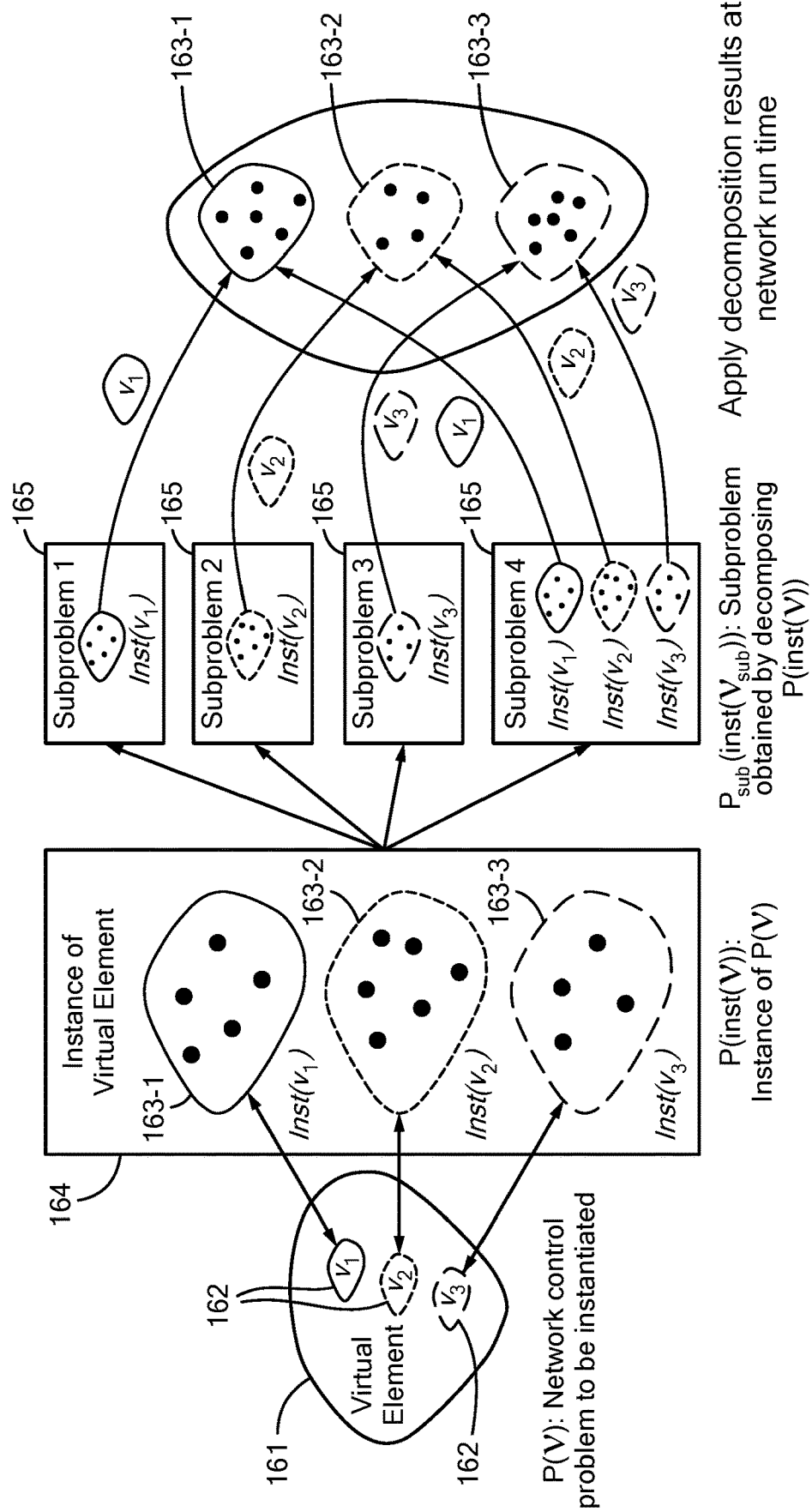
FIG. 4 is a schematic illustration of a basic principle of network control problem decomposition based on disciplined instantiation (DI)

In FIG. 4 illustrates a basic principle of the DI-based decomposition approach by considering a network control problem 161 that involves three virtual elements 162, $v_1$, $v_2$, and $v_3$, which, e.g., can be Neighbors of Node for nodes 1, 2 and 3, respectively. Let inst($v_i$) represent the instance of virtual element $v_i$, denote V={$v_1$, $v_2$, $v_3$} as the set of all the three virtual elements 163-1, 163-2, 163-3 and further denote the set of instances for all $v_i \in V$ as inst(V). Then, the objective of DI is to create a unique instance for each virtual element $v_i \in V$ such that there exists a one-to-one mapping between V and inst(V).

Denote P(V) as the network control problem to be instantiated, and let P(inst(V)) represent the specific instantiated problem 164 obtained by instantiating P(V). Then, P(inst(V)) can be decomposed into a set of subproblems $P_{sub}$(inst($V_{sub}$)), 165, each involving only a subset $V_{sub}$ of the virtual elements with $V_{sub} \subset V$. For example, in FIG. 4, P(inst(V)) has been decomposed into four subproblems 165, with the first subproblem involving only virtual element $v_1$, the second involving only $v_2$, the third involving only $v_3$ while the fourth involves all three virtual elements. Because of the one-to-one mapping between each virtual network element $v_i$ and its instance inst($v_i$), the decomposition results obtained by decomposing P(inst(V)) are also applicable to the original problem P(V), 161, represented in virtual elements 162 and hence its various specific instances 163-1, 163-2, 163-2 at network run time 166.

In the above procedure, the key is to guarantee one-to-one mapping between each virtual element $v_i$ and its instance inst($v_i$). This cannot be achieved by generating arbitrarily disjoint instances for different virtual elements $v_i$ because active network elements assume multiple roles as described in Section 3. For example, a physical link needs to be involved in the instances of virtual element "Links of Session" for all the sessions sharing the link. In the following, the two rules are described, following which instances are generated in WINOS, i.e., equal cardinality and ordered uniqueness, and then a discussion is provided regarding why the two rules are needed for DI. Before this, two categories of virtual elements, i.e., global and local virtual elements, are identified. Section 3 above includes a definition of virtual element.

A global virtual element is a virtual element whose set of physical network entities have the same entity type (e.g., node, or link) and spans over the entire network, e.g., element netnd represents Nodes in Network, the set of all users $\mathcal{J}$ in (2)-(4).

Differently, a local virtual element comprises a subset of physical network entities of the network, and hence is a subset of the corresponding global virtual element. For example, local virtual element nbrnd (i.e., Neighbors of Node) is a subset of global virtual element Nodes in Network; as another example, in (2)-(4), since $\mathcal{J}_i$ is a subset of $\mathcal{J}$, i.e., $\mathcal{J}_i \subset \mathcal{J}$, $\mathcal{J}_i$ is a local virtual element while $\mathcal{J}$ is a global virtual element.

Rule 1:

Equal Cardinality. This rule requires that all the instances for the same type of local virtual elements, e.g., Neighbors of Node, must have the same cardinality, i.e., the same number of members. Instances that satisfy this requirement are called peer instances.

In WNOS, this is achieved by peer random sampling, a technique that can be used to generate peer instances. Specifically, given a user-defined network control problem, the global virtual element denoted as $v^{glb}$ is first instantiated using a set of pre-determined number $N^{glb}$ of elements, i.e., |inst($v^{glb}$)|=$N^{glb}$ with inst($v^{glb}$) being the instance of the global virtual element $v^{glb}$ and |inst($v^{glb}$)| being the cardinality of inst($v^{glb}$). The resulting instance inst($v^{glb}$) can be used to serve as the mother set to generate instances for those local virtual elements $v^{lcl}$.

Then, each local virtual element $v^{lcl}$ can be instantiated by randomly selecting a subset of members from the mother set inst($v^{glb}$), i.e., the instance of the global virtual element $v^{glb}$. Denote the resulting subset instance as inst($v^{lcl}$); then |inst($v^{lcl}$)|=$N^{lcl}$ and inst($v^{lcl}$) $\subset$ inst($v^{glb}$), where $N^{lcl}$ is the cardinality of instances for local virtual elements.

Rule 2: Ordered Uniqueness.

With this rule, a unique instance will be generated for each local virtual element $v_{lcl}$. This means that no two subsets generated by peer random sampling will be identical.

In WNOS, this is accomplished by hash checking, as in (6):

$$inst(v^{lcl}) \xrightarrow{sort(\cdot)} inst'(v^{lcl}) \xrightarrow{h(\cdot)} hid^{lcl}, \quad (6)$$

where the members of $inst(v^{lcl})$, i.e., the instance for local virtual element $v^{lcl}$, are first sorted, and then a unique id $hid^{lcl}$ is calculated for the sorted instance $inst'(v^{lcl})$ using a hash function $h(\cdot)$. A hash function is a function that can be used to map an arbitrary-size data (instances in this case) to a fixed-size id. In WNOS, hash function is used to enable fast uniqueness checking by generating an id for each of the generated instances.

Rationale for the Rules.

The above two rules together guarantee that there exists a one-to-one mapping between the local virtual elements and their instances. As discussed above, this is the key to guarantee that the decomposition results obtained based on DI are also applicable at network run time. To show how the one-to-one mapping can be achieved following the two rules, taking FIG. 5 as an example, A, B, C and D represent four specific instances of local virtual element $v^{lcl}$, with each member in the set representing a primitive element (see Section 3 for the definition), e.g., an individual node. Denote A', B', C', and D', as the sets resulting from sorting the members of A, B, C and D respectively.

It can be seen that set A is mapped to a three-digit id 100 while B is mapped to 111. Instance C is also mapped to 100 since its sorted instance C' is identical to A'. Note that in FIG. 4, in each instantiated sub-problem $P_{sub}(inst(V_{sub}))$ the members of each instance may be re-ordered by the mathematical manipulations decomposing the instantiated network control problem P(inst(V)), e.g., forming and decomposing the dual function in (3), (4) and (5). In (6) function sort(•) guarantees that the same instances are always mapped to the same id regardless of the order of its members; otherwise, instance C will be mapped to a different id 000 as the dashed arrow indicates in FIG. 5.

Figure 5:
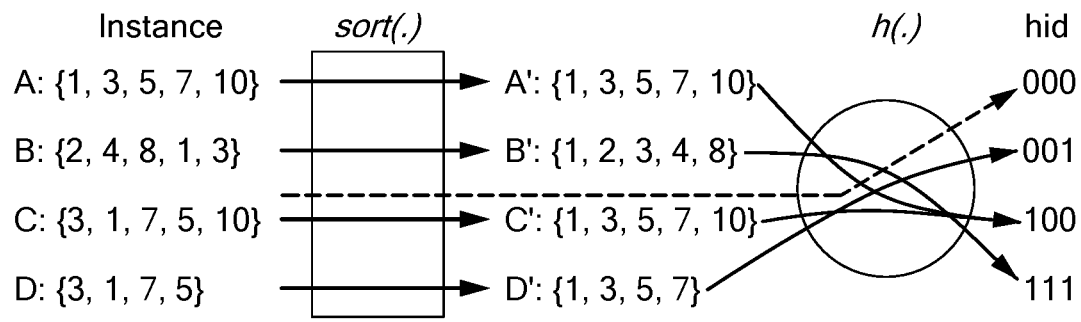
FIG. 5 is an illustration of hash mapping.

Moreover, in FIG. 5 instance D is mapped to an id different from that of A and C. This implies that an instance A and its subset instance D cannot be used at the same time for disciplined instantiation (DI); otherwise, it will be hard to separate them if they appear in the same instantiated network control sub-problems $P_{sub}(inst(V_{sub}))$. In DI, this is prevented by keeping all local instances peer, i.e., it holds true for all local virtual elements that no instance is a proper subset of any other instances. If hash checking finds that a new instance for local virtual element $v^{lcl}$ is identical to any existing instances, i.e., they have the same id, another instance will be created $v^{lcl}$ by peer random sampling.

Following the above two rules, a unique specific instance can be obtained for each of the virtual local elements, while there exists a one-to-one mapping relationship between the local virtual elements and their instances. Thus, decomposing the original network control problem can be equivalently achieved by decomposing the corresponding specific instantiated problem, which is machine understandable and can be automatically conducted.

Decomposition.

Figure 6:
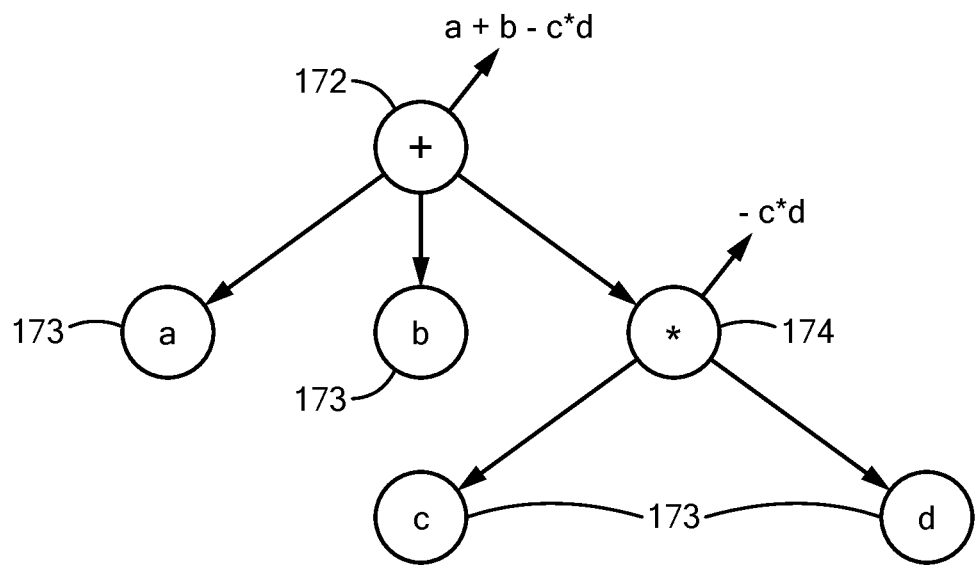
FIG. 6 is a tree representation of mathematical expressions.

Finally, with instantiated network elements in V, the dual function (3) of the network control problem P(V) can be obtained and then decomposed as described in Section 4.1. To enable automated decomposition, the resulting dual function is represented using a tree. As illustrated in FIG. 6, the whole dual function P is represented using the root node 172, which can be represented as the sum of a leaf node 173 and an intermediate node 174, which can be further represented in a similar way. In this way, the decomposition of a network control problem (the dual function if dual decomposition is used) can be conducted in an automated fashion by traveling through all leaf nodes of the tree. The output of automated decomposition is a set of distributed subproblems each involving a single protocol layer and single network node. For each subproblem, a solution algorithm will be automatically generated and the resulting optimized network protocol parameters will be used to control the programmable protocol stack (PPS), discussed below in Section 5: WINOS Implementation.

4.3 Example of DI-Based Decomposition

Consider the following cross-layer network control problem:

$$\text{maximise} \sum_{s \in S} R_s \quad (7)$$
$$\text{subject to:} \sum_{s \in S_l} R_s \leq C_l(\Pi), \forall l \in \mathcal{L}$$

where the objective is to maximize the sum of rate $R_s$ of all flows $s \in S$ at the transport layer; subject to the constraints that, for each link $l \in \mathcal{L}$, the aggregate rate of all the flows in $S_l$, i.e., the set of links sharing link l, cannot exceed the capacity of the link $C_l(\Pi)$ achievable with transmission strategies $\Pi$ at the physical layer, by jointly controlling $R_s$ and $\Pi$. Next is shown how the problem can be decomposed into two single-layer control problem through DI-based decomposition, while more examples of the DI-based decomposition that consider different network problems are discussed in Section 6.

Instantiation.

As defined in Section 4.2, S (i.e., the set of all flows) and $\mathcal{L}$ (i.e., the set of all links) are global virtual elements while $S_i \subset S$ is a local virtual element. In favor of easy illustration, consider cardinality $N^{glb}=3$ for global virtual elements S and $\mathcal{L}$ and $N^{lcl}=2$ for local virtual elements $S_i$, $\forall l \in \mathcal{L}$. Then, the global virtual elements S and $\mathcal{L}$ can be instantiated as S={1, 2, 3} (i.e., the network has in total three flows) and $\mathcal{L}$={1, 2, 3} (i.e., the network has in total three links). The instance of S will then be used as the mother set for instantiating local virtual elements $S_i$, $\forall l \in \mathcal{L}$, as follows.

First, according to rule 1, i.e., equal cardinality, all $S_i$ must have the same number of members. According to rule 2, no two or more $S_i$ will be the same in the sense of ordered uniqueness. If local virtual element $S_i$, i.e., the set of sessions sharing link l, is instantiated to {1,2} and {2,1} for links l=1 and l=2, respectively, the resulting two instances will have the same set of ordered members, which violates rule 2 and hence are not allowed in DI. An example instantiation that meets the two rules, which can be generated by a combination of peer randomly sampling and hash checking as discussed earlier in this section, is $S_1$={1,2}, $S_2$={1,3}, and $S_3$={2,3}. Let $\mathcal{L}_s$ represent the set of links used by flow s. Then, according to the instances for $S_1$, the instances for $\mathcal{L}_s \subset \mathcal{L}$ can be given as $\mathcal{L}_1=\{1,2\}$, $\mathcal{L}_2=\{1,3\}$, and $\mathcal{L}_3$ $\{2, 3\}$. As a result, problem (7) can be instantiated as Maximize $R_1+R_2+R_3$ Subject to: $R_1+R_2 \leq C_1(\Pi)$ $R_1+R_3 \leq C_2(\Pi)$ $R_2+R_3 \leq C_3(\Pi)$ (8)

Decomposition.

Consider dual decomposition as discussed in Section 4.1, then the dual function of (8) can be written as Maximize $R_1+R_2+R_3+\lambda_1[C_1(\Pi)-R_1-R_2]+\lambda_2[C_2(\Pi)-R_1-R_3]+\lambda_3[C_3(\Pi)-R_2-R_3]$ (9)

where $\lambda_1$, $\lambda_2$, and $\lambda_3$ are dual coefficients. By decomposing (9), problem (8) can be decomposed into two single-layer problems:

Transport Layer: $\begin{cases} \text{maximize } R_1 - \lambda_1 R_1 - \lambda_2 R_1, \text{ for } s = 1 \\ \text{maximize } R_2 - \lambda_1 R_2 - \lambda_3 R_2, \text{ for } s = 2 \\ \text{maximize } R_3 - \lambda_2 R_3 - \lambda_3 R_3, \text{ for } s = 3 \end{cases}$ (10)

Physical layer: maximize $\lambda_1 C_1(\Pi) + \lambda_2 C_2(\Pi) + \lambda_3 C_3(\Pi)$ (11)

where, at the transport layer, each flow $s \in \{1, 2, 3\}$ maximizes its own utility by adjusting its transmission rate $R_s$ with given dual coefficients, while the physical-layer subproblem maximizes a weighted-sum-capacity by adapting the transmission strategies $\Pi$.

Application to Run-Time.

The decomposition results can be applied at network run time by taking the transport-layer subproblem for s=1 as an example while the same principles can also be applied to other subproblems. For s=1, the utility of the subproblem can be rewritten as $R_1-(\lambda_1+\lambda_2)R_1$. Then, to determine the dual coefficients of $R_1$ at run time, it is only needed to identify the local virtual element corresponding to instance $\{\lambda_1, \lambda_2\}$, which is virtual element $\mathcal{L}_1$ according to the instantiation results of $\mathcal{L}_s$. This means that, at run time, the dual coefficients for flow s should be collected, e.g., at the source node of flow s, from those links used by the flow.

5. WNOS Implementation

In some embodiments, a WINOS can be implemented with software defined radios (SDR). This is however not easy because of several challenges: (i) with WINOS, one should be able to deploy a large scale network by creating only a single piece of code to define the network control objective in a centralized manner. Since different SDR front-ends are controlled by different hosts, it is challenging to distribute and synchronize the generated code among the hosts; and (ii) there is no existing programmable protocol stack (PPS) that supports cross-layer control with optimizable protocol parameters at each layer. In some embodiments, these challenges can be addressed by the approach described below, in conjunction with a prototype implemented on a testbed with a number of SDRs, followed by a description of the PPS.

5.1 Implementation Approach

An embodiment of WINOS can be deployed over a network of software defined radios. For purposes of explanation, the WINOS is described in conjunction with a prototype employing a network of 21 USRP software radios 30, illustrated in FIG. 7. The WINOS can follow a hierarchical architecture with three tiers, i.e., WINOS control host tier 32, SDR control host tier 34, and SDR front-end tier 36.

Implementation Architecture.

At the top tier 32 of the hierarchical architecture is the WINOS control host 40, based on which one can specify the network control objective using the provided network abstract framework WiNAR 12. The output of this tier is a set of automatically generated distributed solution algorithms 26, which can be sent to each of the SDR control hosts 44. At the second tier 34, the programmable protocol stack (PPS) 16 is installed on each of the SDR control hosts 44. The distributed optimization algorithms 26 received from the WINOS control host 40 are stored at the decision plane 62 of the PPS. At run time, the PPS can be compiled to generate operational code to control the SDR front-ends 48 of the third tier 36. Finally, each of the SDR front-ends (i.e., USRP) receives the baseband samples from its control host via Gigabit Ethernet (GigE) interface and then sends them over the air with transmission parameters 46 dynamically specified in the control commands 47 from the SDR control hosts 44.

A benefit of implementing WINOS based on a hierarchical architecture is to enable scalable network deployment. Specifically, the tier-1 WINOS control host 40 can be connected to all tier-2 SDR control hosts 44 via wireless interfaces 52 (e.g., Wi-Fi, as in the prototype described herein), through which the generated distributed algorithms can be automatically pushed to and installed at each of the SDR control hosts. Hence, one needs to create a single piece of code only in order to control all the 21 USRPs.

WNOS Control Host.

The WINOS includes a control host 40, on which various WINOS functions can be implemented, including the wireless network abstraction framework WiNAR 12, disciplined instantiation 54, automated decomposition 56, and automated numerical solution algorithm generation 58 (described above in Sections 3 and 4). In the implemenation used in the description, the control host is a Dell OPTIPLEX 9020 desktop running Ubuntu 16.04. The WINOS functions have been implemented using a combination of Python 3.0 and CogApp 2.5.1, including the wireless network abstraction framework WiNAR 12, disciplined instantiation 54, automated decomposition 56, and automated numerical solution algorithm generation 58. Development was based on Python to take advantage of its high programming efficiency and high-level expressiveness and the flexible, open-source programming interfaces to GNU Radio for controlling USRPs. CogApp is an open-source software written in Python for template programming, a programming technique based on which the automated numerical solution algorithm generation has been implemented in the current implementation. It will be appreciated that other programming languages and interfaces can be used.

5.2 Programmable Protocol Stack

Figure 7:
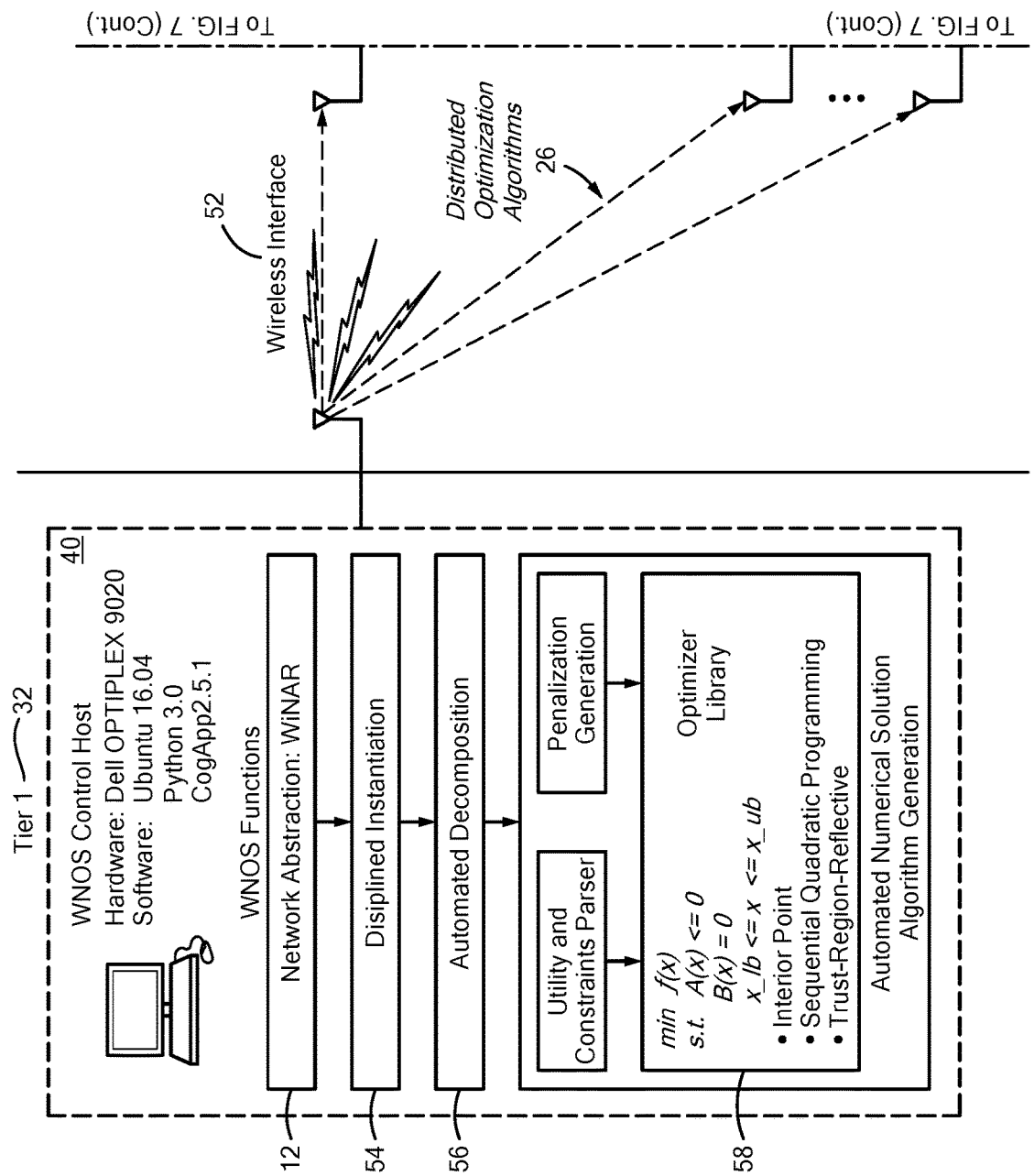
FIG. 7 is a schematic illustration of an embodiment of a wireless network operation system.
Figure 7:
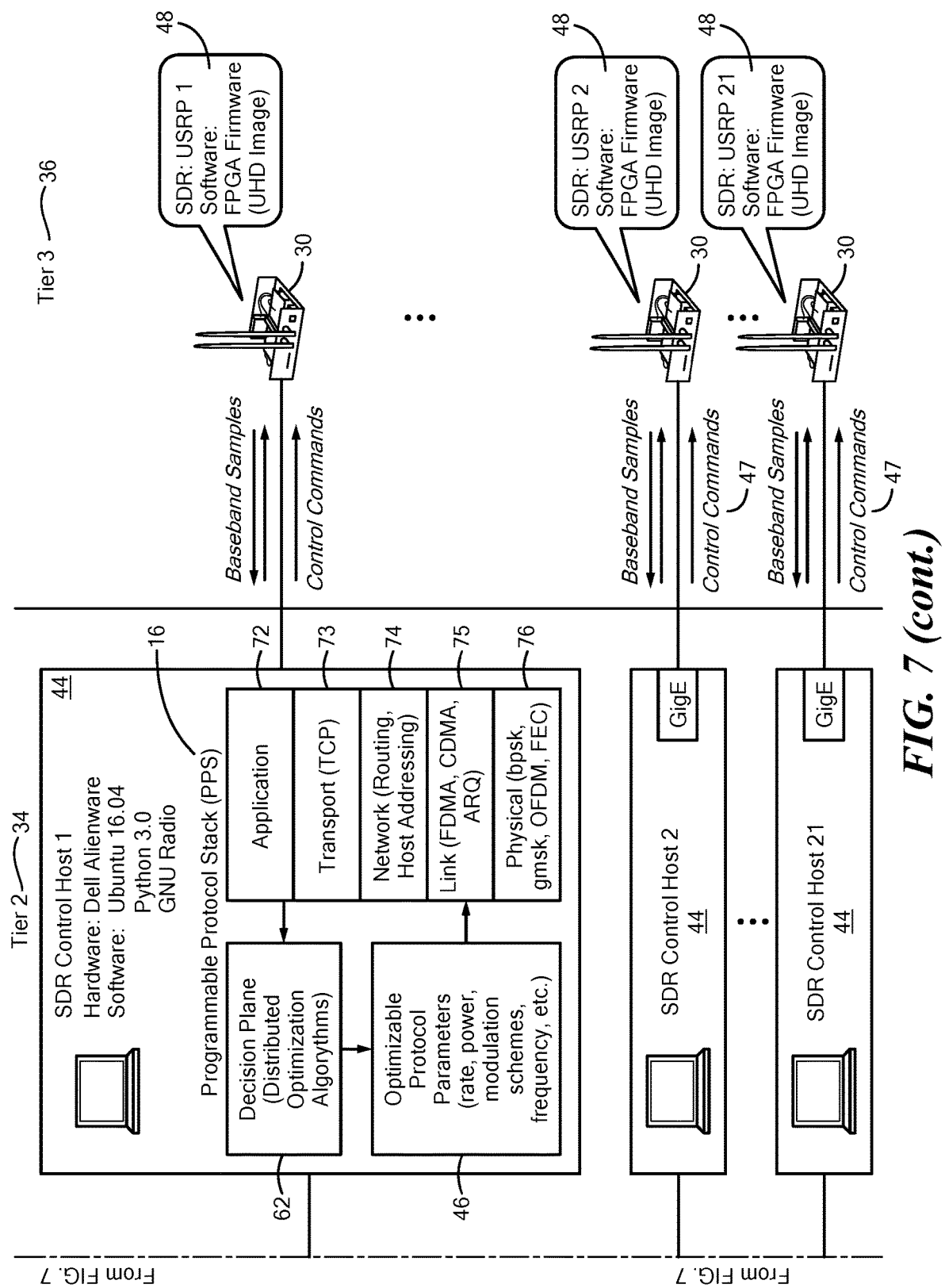

As shown in FIG. 7, the programmable protocol stack (PPS) 16 was installed on each of the SDR control hosts 44. In the prototype, the SDR control hosts were Dell Alienware running Ubuntu 16.04. The PPS was developed in Python on top of GNU Radio to provide seamless controls of USRPs based on WINOS. A decision plane 62 was provided to install those distributed optimization algorithms generated by the WINOS control host and then pushed to the SDR control hosts.

The developed PPS covered all the protocol layers. Based on the protocol stack, a multi-hop wireless ad hoc network testbed was established using software-defined radio devices to verify the effectiveness of the designed wireless network operating system (WINOS).

Application Layer.

The application layer 72 opens end-to-end sessions for transferring custom data such as files, binary blobs, as well as random generated data, among others. A session can be established between any two network entities and multiple sessions can be established at the same time. Programmable parameters include the number of sessions and the number of hops in each session, as well as the desired behavior of each session, e.g., maximum/minimum rate and power budget of the nodes, among others.

Transport Layer.

The transport layer 73 implements segmentation, flow control, and congestion control as well as addressing. This layer supports end-to-end, connection-oriented and reliable data transfer. To accomplish this, a Go-Back-N sliding window protocol can be implemented for flow control and congestion control, and transport layer acknowledgments are used to estimate the end-to-end Round Trip Time (RTT), which serves as an estimate of network congestion. Programmable parameters at this layer include transmission rate, sliding window size, and packet size, among others.

Network Layer.

The network layer 74 implements host addressing and identification, as well as packet routing. The network layer is not only agnostic to data structures at the transport layer, but it also does not distinguish between operations of the various transport layer protocols. Routing strategies can be programmed at this layer.

Datalink Layer.

The core functionalities of the datalink layer 75 can include fragmentation/defragmentation, encapsulation, network to physical address translation, padding, reliable point-to-point frame delivery, Logical Link Control (LLC), and Medium Access Control (MAC), among others. In particular, the reliable frame delivery employs a hybrid LLC's Stop and Wait ARQ protocol and Forward Error Correction (FEC) mechanism (Reed-Solomon coding), such that frames are padded with FEC code and retransmissions are performed when the link is too noisy. The FEC is dynamic, reprogrammable, and can automatically adapt to the wireless link conditions at fine granularity, by increasing or decreasing the channel coding rate based on the observed packet error rate. Programmable parameters at this layer include channel coding rate, maximum retransmission times, and target residual link-level packet error rate, among others.

Physical Layer.

The physical layer 76 can include a variety of modulation schemes. In the example, the physical layer included both CDMA and OFDM access schemes. Additional modulation schemes can include, without limitation, Binary phase-shift keying (BPSK), Quadrature phase-shift keying (QPSK), Gaussian Minimum Shift Keying (GMSK) among others. Programmable parameters at the physical layer include modulation schemes, transmission power, and receiver gain, among others.

6. Examples

As noted above, a WINOS was prototyped over a testbed with software defined radios. The WINOS was deployed over a network with 21 USRP software radios. The prototyping diagram is illustrated in FIG. 7, which follows a hierarchical architecture with three tiers, i.e., WINOS control host, SDR control host and SDR front-end.

The effectiveness, flexibility as well as scalability of the proposed WINOS was evaluated by conducting experiments on the developed WINOS prototype, which is a testbed on large-scale USRP testbed with 21 nodes. In Section 6.1, the automated network control problem decomposition was demonstrated by considering the specific network. The experimental evaluation results are shown in Section 6.2.

6.1 Automated Network Control Problem Decomposition

How WINOS works can be shown by taking as an example the network control problem referred to as JOCP, described in detail in M. Chiang, "Balancing Transport and Physical Layers in Wireless Multihop Networks: Jointly Optimal Congestion Control and Power Control," IEEE JSAC, vol. 23, pp. 104-116, January 2005. The objective of this network control problem is to maximize the sum utility of a set of concurrent sessions by jointly optimizing the transmission rate of each session at the transport layer and controlling the transmission power of each transmitter at the physical layer. The underlying mathematical model of the network control problem is given as $$\text{maximize} \sum_{s \in S} U_s(x_s) \quad (12)$$

$$\text{subject to:} \sum_{\substack{s: l \in L(s) \\ x, P \geq 0}} x_s \leq c_l(P), \forall l \in \mathcal{L}$$

Where $x \triangleq (x_s)$, with $x_s$ representing the transmission rate of session $s \in S$, $P \triangleq (P_n)$ is the transmission power profile of all the involved network nodes, $c_l(P)$ is the achievable capacity of link $l \in \mathcal{L}$ on path $L(s)$, and $U_s(x_s)$ is the achievable utility of sessions.

WNOS Representation.

Based on the network abstraction interface provided by WINOS, i.e., WiNAR, network control problem JOCP can then be defined in a high-level centralized abstract fashion as shown in FIG. 8, where network utility in (12) is defined as the sum rate of all sessions, i.e., $U_s(x_s)=x_s$ for each session $s \in S$ in (12). In the high-level definition in FIG. 8, there are three virtual network elements, i.e., netses, netlnk and lnkses, representing the set of all sessions, the set of all links and the set of links used by a session, respectively. The former two are global elements representing the set of all sessions S and the set of all $\mathcal{L}$ links in the network, respectively. The third virtual element lnkses, i.e., {s: l∈L(s)} in (12) represents the set of sessions sharing the same link, and hence is a local element associated with each link instance of global virtual element netlnk.

For instantiation of global virtual elements, the cardinality of the set of instances is by default set to 20, while it is set to 10 for local virtual element instantiation. Based on this, WINOS can generate up to 184756 unique instances for each abstract network element, which is sufficient to decompose moderate-size network control problems with up to hundreds of constraints.

Table 1 (shown in FIG. 17) shows the instantiation result of global virtual element Links in Network and local virtual element Sessions of Link, where for each link instance a unique set of sessions sharing the link was constructed based on peer sampling and hash checking as described in Section 4.2. The set of links used by a session instance can then be instantiated accordingly, e.g., {0, 3, 4, 7, 9, 10, 11, 12, 13, 14, 18, 19} for Session 4 as underlined in Table 1.

Problem Decomposition.

Consider dual-based cross-layer decomposition (refer to Section 4.1 for the decomposition theory) as specified in the high-level abstract network control problem definition in FIG. 8. The resulting dual representation of the user-defined centralized network control of (12) is given in FIG. 9, where the network constraints of (12) (constraints component) have been absorbed into the utility function (utility component), by introducing dual coefficients lbd_id with id being the index of the link instance to which each dual coefficient is associated. The objective is to decompose the initial user-defined centralized network control problem by decomposing the corresponding dual representation into a set of sub-problems each involving a single network element, e.g., a single session 4 as shown in FIG. 9.

To this end, the dual representation is further represented as a three-level tree of sub-expressions, as shown in FIG. 10, where level 0 is the initial dual expression in FIG. 9, level 1 comprises sub-expressions of sum operation in the initial representation, while each expression at level 1 can be further represented as a multiplication of two sub-expressions at level 2. Then, to decompose the user-defined central network control problem, one only needs to walk over all level-1 elements of the tree and determine to which sub-problem each of the elements should be categorized. For cross-layer decomposition, this can be accomplished as follows:

For each level-1 sub-expression, extract the protocol layer information of the network element involved in the sub-expression using Read operations defined in Section 3.

Categorize the sub-expression into the sub-problem of the corresponding protocol layer.

The decomposition results in a set of subproblems each involving only a single protocol layer. For example, in FIG. 10, level-1 element sesrate_00 is categorized into the transport-layer subproblem because the network element sesrate is a transport layer parameter representing the source rate of a session. Accordingly, subexpression lnkcap_00*lbd_00 is categorized as a subproblem corresponding to the physical layer.

Similarly, each of the resulting sub-problems can be further decomposed into sub-problems each involving a single network element, e.g., node, session, so that they can be solved in a distributed fashion and result in distributed control actions. As shown in FIG. 10, this can be accomplished as follows:

Extract the index information of the network element involved in each level-1 sub-expression, e.g., 00 for level-1 subexpression sesrate_00.

Categorize the sub-expression into the sub-problem corresponding to a distributed subproblem, e.g., categorize sesrate_00, −sesrate_04*lbd_10 and −sesrate_19*lbd_07 as the subproblems corresponding to sessions 0, 4 and 19, respectively.

Mapping From Instantiation to Abstract Domain: Recall in Section 4.2 that the objective is to construct a set of instantiations of the user-defined high-level abstract network control so that decomposing any of the problem instantiations decomposes the abstract problem. As described in Section 4.2, this is guaranteed by the one-to-one mapping between virtual network elements and their instantiations obtained through peer-sampling and hash checking. Next, the one-to-one mapping is shown taking the following instantiated transport-layer subproblem as an example.

$$\text{sesrate\_04} - \text{sesrate\_04} * \quad (13)$$
$$(\text{lbd\_09} + \text{lbd\_11} + \text{lbd\_12} + \text{lbd\_13} + \text{lbd\_14} + \text{lbd\_18} +$$
$$\text{lbd\_19} + \text{lbd\_00} + \text{lbd\_03} + \text{lbd\_04} + \text{lbd\_07} + \text{lbd\_10})$$

It can be see that (13) is the subproblem by categorizing those Session 4 components in FIG. 8. In (13), dual coefficients lbd are parameters that can be received by the source node of session 4 from links with indexes {09, 11, 12, 13, 14, 18, 19, 00, 03, 04, 07, 10}, which is namely the instantiation set for local virtual element Links of Session for Session 4, as shown in Table 1. Hence, (13) can be further represented for all sessions, which corresponds to the global virtual network element Sessions of Network, $$\text{sesrate} - \text{sesrate} * \text{sum}(lbd) \quad (14)$$

where lbd represents the vector of dual parameters received by each source node of the session at network run time.

Automated Solution Algorithm Generation.

For each of the subproblems resulting from automated network control problem decomposition described in Section 4.2, a numerical solution algorithm (e.g., interior-point method) is selected to solve the problem, and the optimization results are then fed into the decision plane of a Programmable Protocol Stack (PPS). The diagram of automated algorithm generation is illustrated in FIG. 7. Each of the subproblem instantiations, e.g., the transport layer subproblem in (13), is fed into utility and constraints parser and penalization generation components (described below in this section) to determine the required parameters by an algorithm template, including optimization variable x, utility function $f(x)$ as well as inequality and equality constraint parameters A, B, x_lb and x_ub in FIG. 7. Then, based on the requirements of the solution algorithms in terms of computing efficiency and optimality precision specified by network controllers via network control interface layer, a numerical solver is selected by the optimization engine to obtain the globally optimal solution for convex problems and a suboptimal solution if the problems are nonconvex. A wide set of numerical solvers can be integrated into WINOS to meet diverse requirements in convergence speed and optimality precision for small, moderate and large-size network control problems, including, without limitation, Interior-Point (IP) method (M. E. H. R. H. Byrd and J. Nocedal, "An Interior Point Algorithm for Large-Scale Nonlinear Programming," SIAM Journal on Optimization, vol. 9, no. 4, pp. 877-900, 1999); Sequential Quadratic Programming (SQP) (P. E. Gill, W. Murray, and M. H. Wright, Practical Optimization. London: Academic Press, 1981); and Trust-Region-Reflective (TRR) (R. H. Byrd, J. C. Gilbert, and J. Nocedal, "A Trust Region Method Based on Interior Point Techniques for Nonlinear Programming," Mathematical Programming, vol. 89, no. 1, pp. 149-185, 2000), among others. The output of the automated algorithm generator is a set of optimization algorithms that can be directly executed at each protocol layer to optimize a penalized version of local control objectives.

Penalization.

As described in Section 4.2, the objective of penalization is to provide a signaling framework, based on which the resulting distributed algorithms can exchange certain signaling messages in favor of improved network performance. In WINOS, this is accomplished by converting the mathematical expressions of each sub-problem obtained through decomposition into a symbolic domain. Taking the physical-layer sub-problem as an example, where the objective is to maximize the sum capacity of all links with lnkcap expressed as $$lnkcap = freq * \log_2\left(1 + \frac{lnkpwr * lnkgain}{lnknoise + lnkgain\_itf * itfpwr}\right) \quad (15)$$

where freq, lnkpwr, lnkgain, lnknoise, lnkitf lnkgain itf and itfpwr are parameters that can be measured online for each distributed subproblem. Then, taking DPL as example in Section 4.1, the penalization item can be obtained in an automated fashion in the symbolic domain by deriving the derivative of the lnkcap expression with respect to the strategy of each interfering agent, i.e., itfpwr in (15).

In (15) the link expression has been constructed for CDMA at the physical layer as specified in the high-level centralized abstract network control problem definition in FIG. 8. Based on WINOS, network designers can configure the network protocols operating at different layers, e.g., OFDM at physical layer, and define their own network utilities. For example, in FIG. 8 by defining the network utility as expr=mkexpr('sum(log(wos_x))', 'wos_x'), a new subproblem log(sesrate)−sesrate*sum(lbd) is obtained at the transport layer for each session, which introduces proportional fairness among the sessions.

The generated solution algorithms, as discussed in Section 2, are fed into the decision plane of the Programmable Protocol Stack (PPS), and the optimization results obtained by solving local network control problems are used to dynamically configure the protocol parameters for each SDR node. Next the performance of WINOS on software-defined radio testbed is evaluated in various networking scenarios.

6.2 Software-Defined Radio Implementation

Figure 11A:
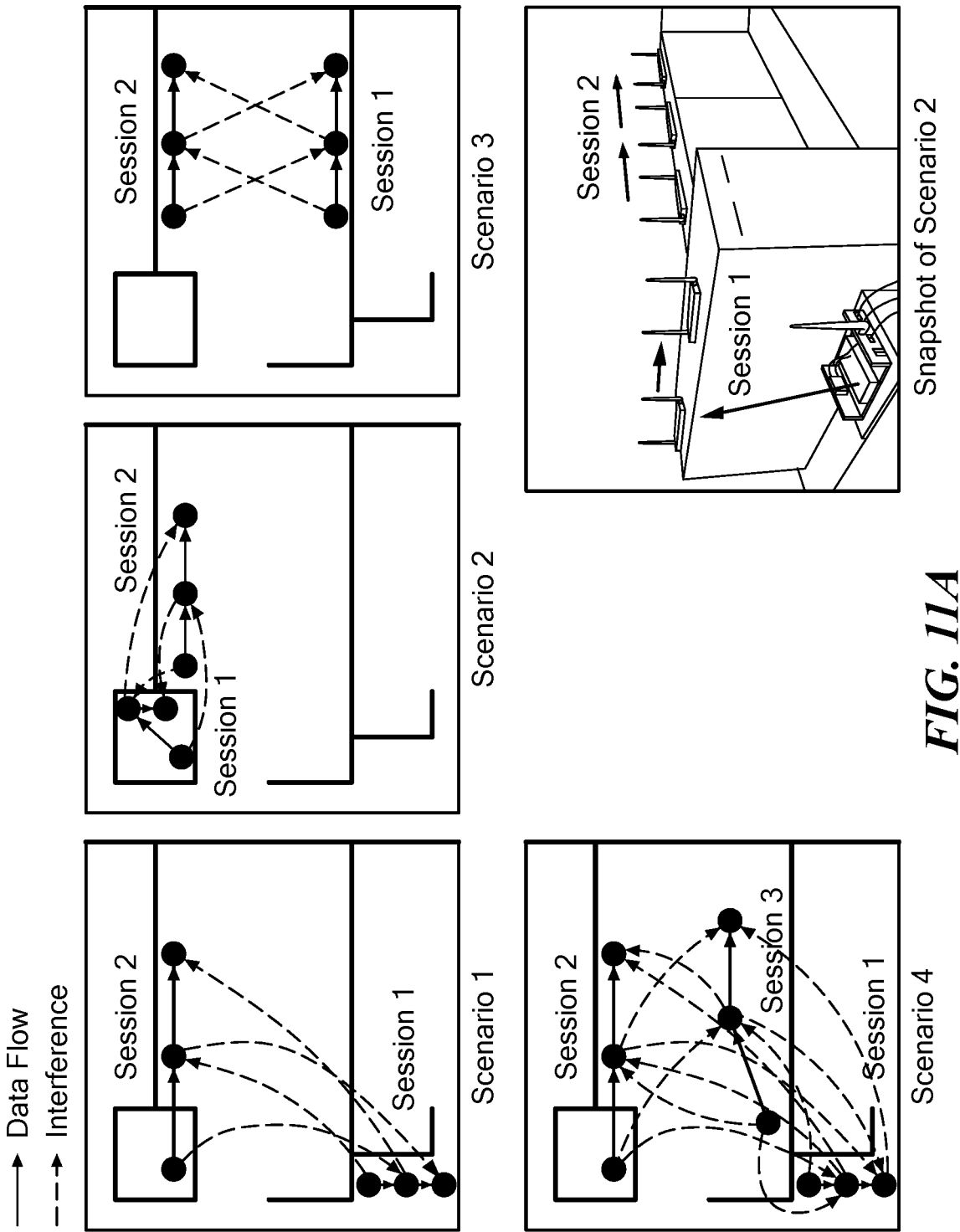
FIG. 11A is a schematic illustration of experimental scenarios 1-4.
Figure 11B:
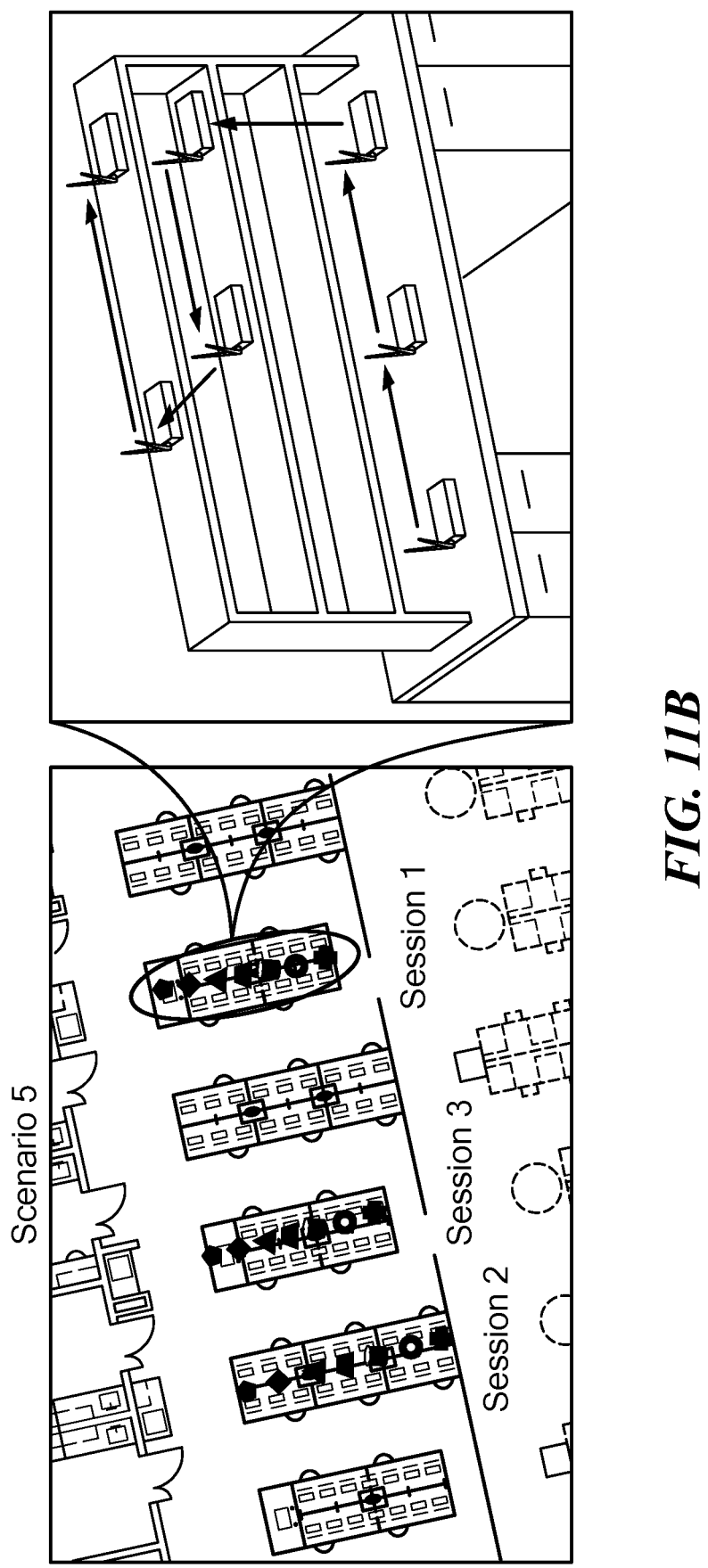
FIG. 11B is a schematic illustration of experimental scenario 5.

WINOS was tested on the designed SDR testbed in five different networking scenarios. As shown in FIGS. 11A and 11B, Scenarios 1-3 deploy six nodes and two traffic sessions; while Scenario 4 considers nine nodes and three traffic sessions, with each session spanning over two hops. In Scenario 5, three sessions are deployed over 21 nodes, with six hops for each session. Six spectrum bands in the ISM bands are shared by the 21 USRPs, with bandwidth of 200 kHz for each spectrum band. At each USRP, the data bits are first modulated using GMSK and then sampled at sampling rate of configured 800 kHz. Reed-Solomon (RS) code was used for forward error coding (FEC) with coding rate ranging from 0.1 to 0.4 at a step of 0.1. The code to repeat the experiments is available at http://www.ece.neu.edu/wineslab/WNOS.php.

Through the experiments, the following properties were evaluated:

Effectiveness. Through experiments in Scenarios 1-3, it was shown that WNOS-based network optimization outperforms non-optimal or purely locally optimal (greedy) network control;

Flexibility. Through experiments in Scenarios 4 and 5, the flexibility of WINOS in modifying the global network behavior by changing control objectives and constraints was shown.

Scalability. In Scenario 5, the scalability of WINOS by deploying code over a large-scale network was shown.

Effectiveness.

The effectiveness of WINOS on the developed SDR testbed was shown. At the physical layer, two spectrum bands were used, 1.3 GHz and 2.0 GHz. If two transmitters (either source or relay) are tuned to the same spectrum band, their transmissions will interfere as shown in FIG. 11A. The control objective is to maximize the sum utility of the two sessions (referred to as Control Program 1, which can be specified by expr=mkexpr('sum(log(wos x))', 'wos_x') as in (12)) by jointly controlling the transmission rate at the transport layer and the transmission power at the physical layer. For each session, the utility is defined as the logarithm of the achievable end-to-end throughput.

Five schemes were tested: (i) WINOS-T-P: transport and physical layers are jointly controlled using the optimization algorithms automatically generated by WINOS; (ii) WINOS-T: only the transport layer rate is controlled by WINOS; (iii) WINOS-P: only the physical layer power is controlled by WINOS; (iv) neither transport or physical layer are controlled by WINOS; and (v) Best Response: maximum rate and power are used at the transport and physical layers, respectively. In all schemes, the initial operating points (i.e., rate and power) were randomly generated. Power control was implemented by controlling the transmit gain (which takes value from 0 to 30 dB) of the FPGA of USRP N210s.

Figure 12A:
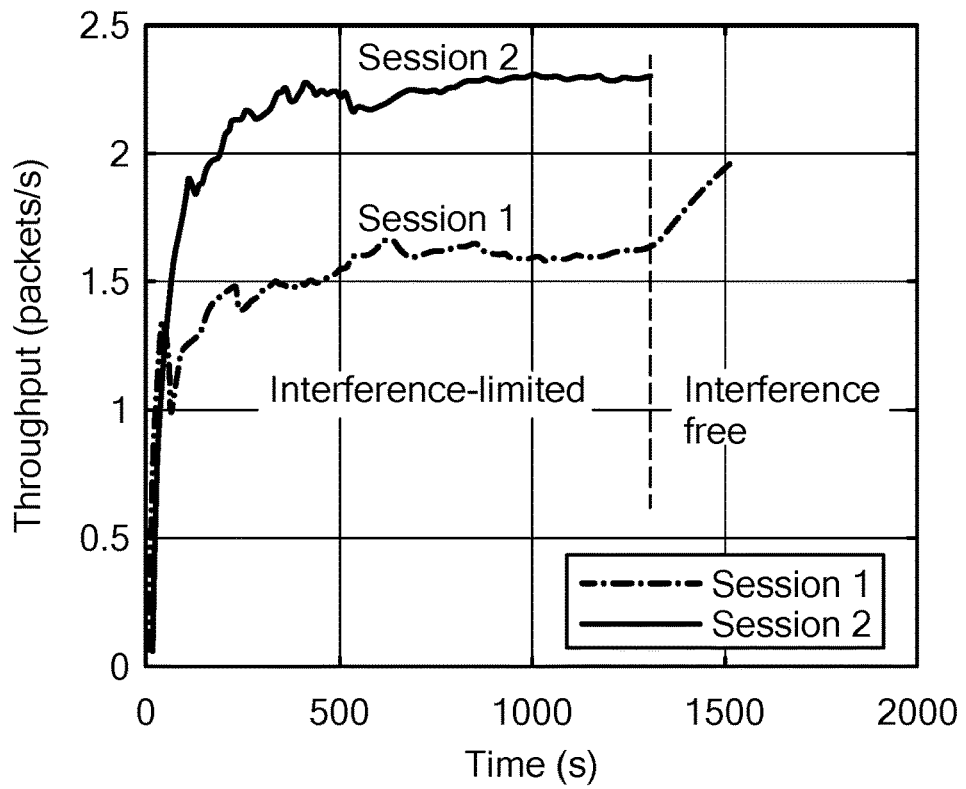
FIG. 12A is a graph of end-to-end throughput of sessions 1 and 2.

WINOS was first evaluated in an environment with tight coupling of different sessions via interference. FIG. 12A reports the achievable end-to-end throughput vs. time for the two sessions (in terms of packets/s) in network scenario 2. The packet length was set to 2048 bits. The throughput of the two sessions converged to 1.6 and 2.3 packets/s when they were active simultaneously, i.e., in the interference-limited region in FIG. 12A. After session 2 was done transmitting all of its packets (3000 packets), session 1 operated in the interference-free region and its throughput started to increase significantly.

Figure 12B:
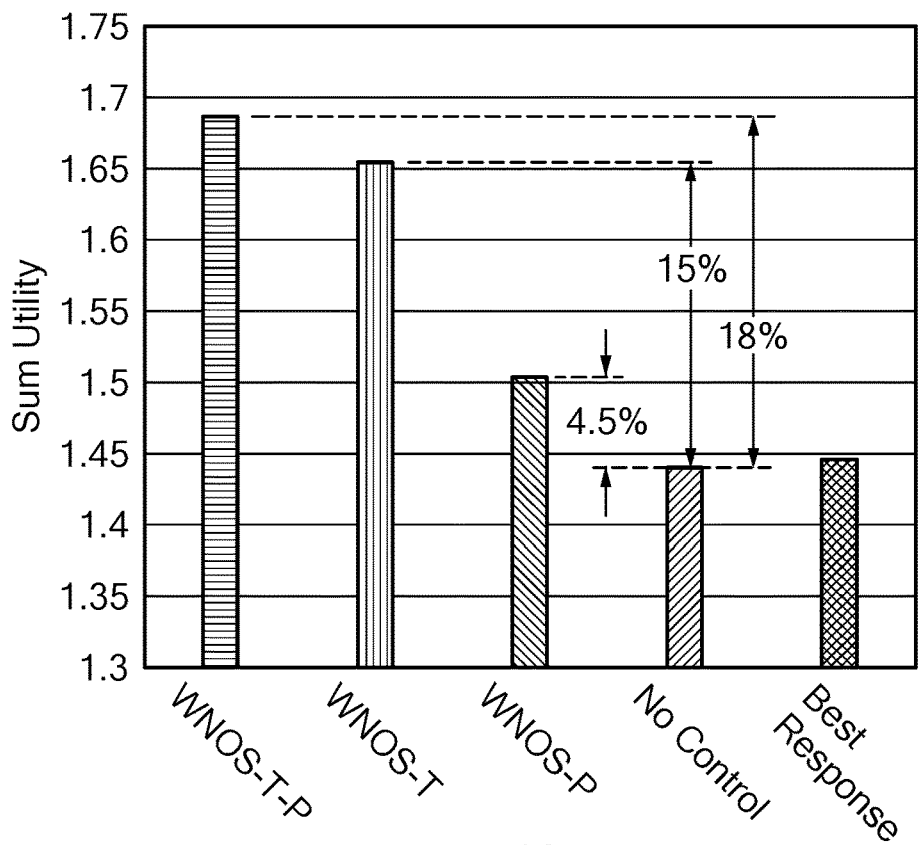
FIG. 12B is a graph of the average sum utility of scenario 1.
Figure 12C:
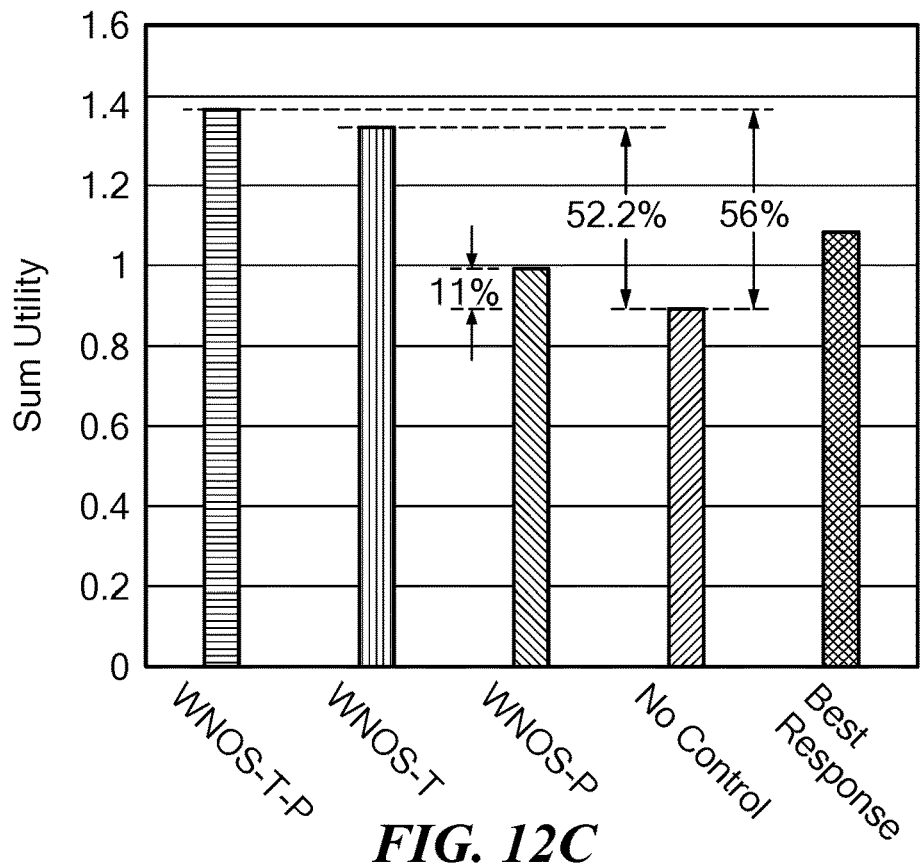
FIG. 12C is a graph of the average sum utility of scenario 2.
Figure 12D:
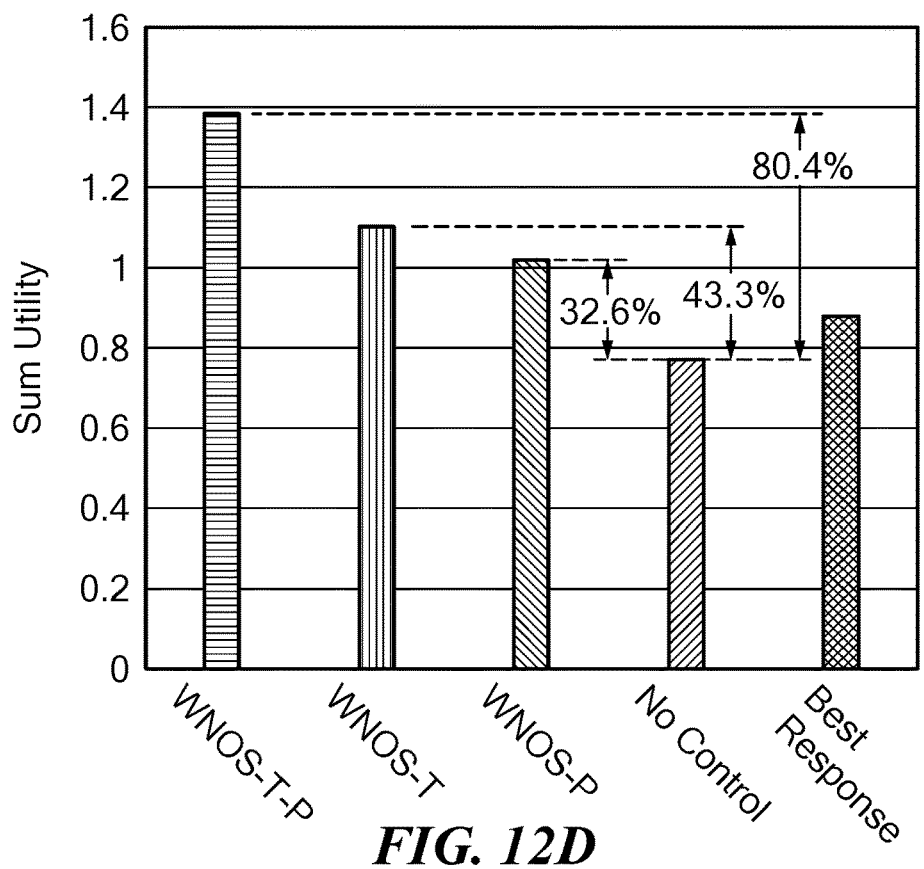
FIG. 12D is a graph of the average sum utility of scenario 3.

The average performance of the five schemes is reported in FIGS. 12B, 12C, and 12D for network scenarios 1, 2 and 3, respectively. As discussed above, the three network scenarios were designed to present different levels of interference between the two sessions. The sum utility achievable by the best response scheme is a good indicator since with this scheme each node always transmitted at the maximum power, i.e., 30 dB transmit gain was used for USRP N210. For example, with the least amount of interference in scenario 1, best response achieved the highest sum utility of 1.44 compared to 0.89 in network scenario 3. From the three figures, it can be seen that, compared with no control, considerable performance gain was achieved by the WNOS-T-P, i.e., with transport and physical layers jointly controlled, and this gain increased as the interference level increased. It can be emphasized that this was obtained by writing only a few lines of high level code on a centralized abstraction, while the behavior was obtained through automatically generated distributed control programs. Specifically, up to 80.4% utility gain was achieved in network scenario 3, which had the highest interference. In the case of no cross-layer control, i.e., only one protocol layer was optimized, WINOS still achieved significant utility gain, which varied from 4.5% to 52.2% in the tested instances.

Modifying Network Behavior.

Figure 13:
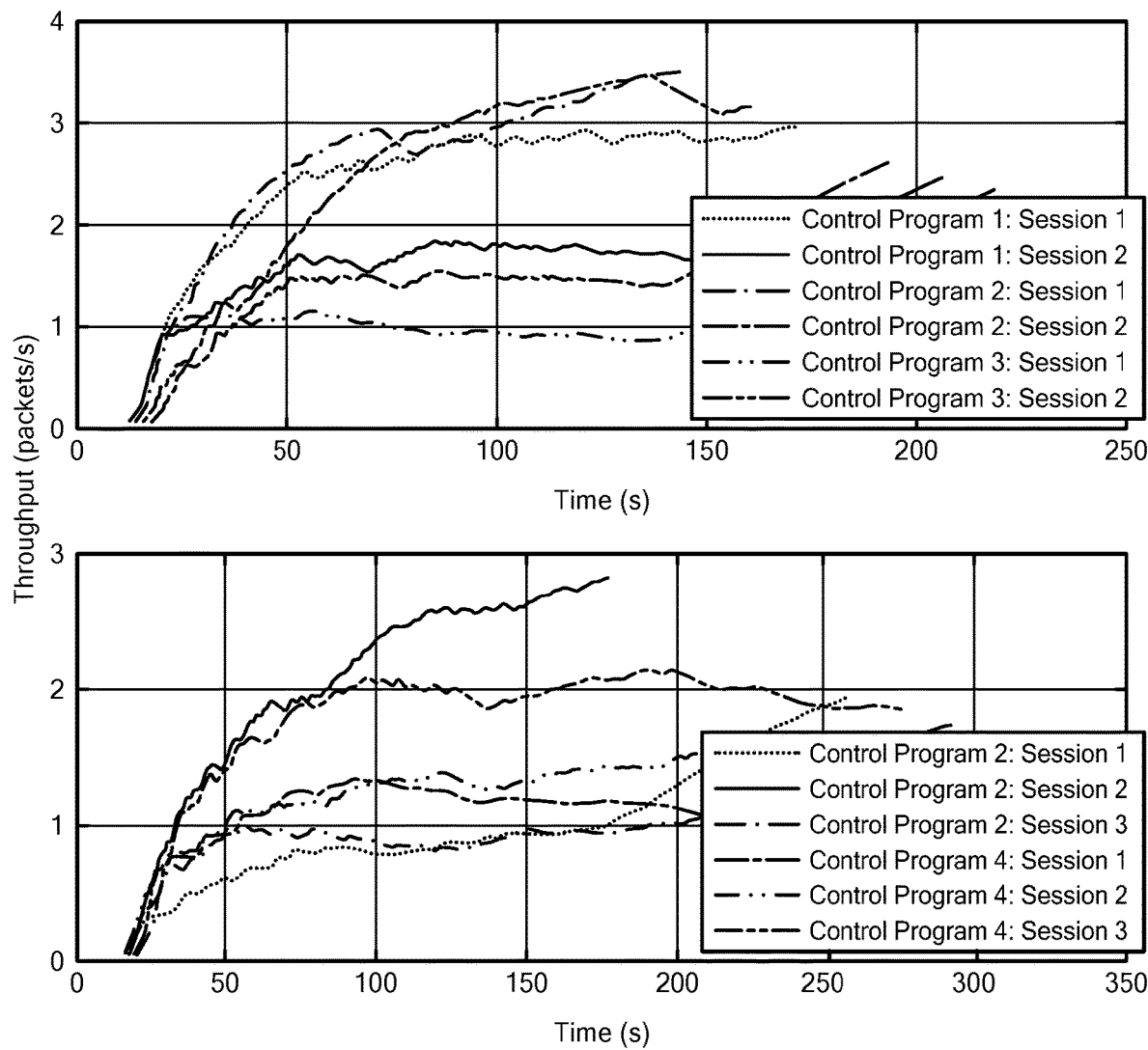
FIG. 13 is a graph of network behaviors with different control programs.

The following experiments show WNOS's capability of modifying the global network behavior by changing a few lines of code. To achieve different desired network behaviors, one only needs to change the centralized and abstract control objective or modify the constraints while WINOS generates the corresponding distributed control programs automatically. For example, if the control objective is to maximize the sum throughput (i.e., maximize Ex) of all sessions instead of sum log throughput (i.e., maximize Σ log(x)) as in Control Problem 1 (Control Program 2), this can be accomplished by rewriting one line of code only: expr=mkexpr('sum(wos_x)', 'wos_x'). As shown in FIG. 13 (top), compared with Control Program 1 (i.e., maximizing sum-log-throughput), Control Program 2 obtains higher sum throughput (4.92 vs. 4.66 in packets/s) by increasing the throughput of session 1 while decreasing the throughput of session 2, in this way, as expected, trading throughput for fairness. This is because it is easier for session 1 (see scenario 1 in FIG. 11) to achieve higher throughput than session 2 since session 1 has shorter links.

Furthermore, if the network user needs to limit the maximum transmit power of the first session (Control Program 3), this can be accomplished simply by defining a new constraint using the following two lines of code:

ntmake_var('wo_s z', [ntses, seslnk, lkpwr], [1, all, None])

ntadd_cstr('wos_z<5', 'wos_z')

where the first line of code defines link power as a variable, while the second line specifies the upper bound constraint. The resulting session behaviors are shown in FIG. 13 (top), where the throughput of session 1 has been effectively bounded. In another example, three sessions are deployed as in scenario 4 in FIG. 11A. The normalized transmission power of sessions 2 and 3 are programmed to be smaller than 6 and greater than 20, respectively (Control Program 4). It can be seen in FIG. 13 (bottom) that, compared with Control Program 2, the throughput of sessions 2 and 3 can be successfully changed with the new control program. As shown above, all this needs only two new lines of code to characterize the behavior of session 3.

Flexibility and Scalability.

The flexibility and scalability of WINOS was further tested in changing control programs on a large-scale SDR testbed of 21 USRPs (i.e., Scenario 5) and by considering two sharply different network control objectives: sum-log-rate maximization and power minimization. Again, changing the network control behaviors based on WINOS required modifying a couple of lines of code only. The WiNAR code for defining the power minimization control objective is as follows:

nt.make_var('wos_x', [ntlk, lkpwr], [all, None]);
expr=mkexpr('sum(wos_x)', 'wos_x'), where the first line states the transmission power of all the active links in the network as control variables, while the second line defines the sum of the transmission power as the utility function to be minimized.

Figure 14A:
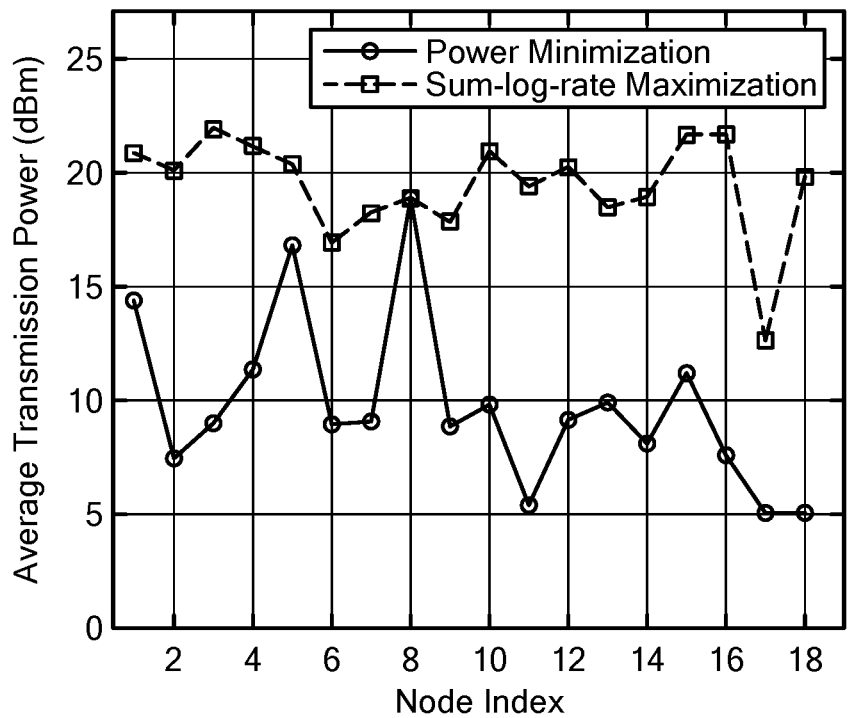
FIG. 14A is a graph of transmission power for two different control objectives: sum-log-rate maximization and power minimization.
Figure 14B:
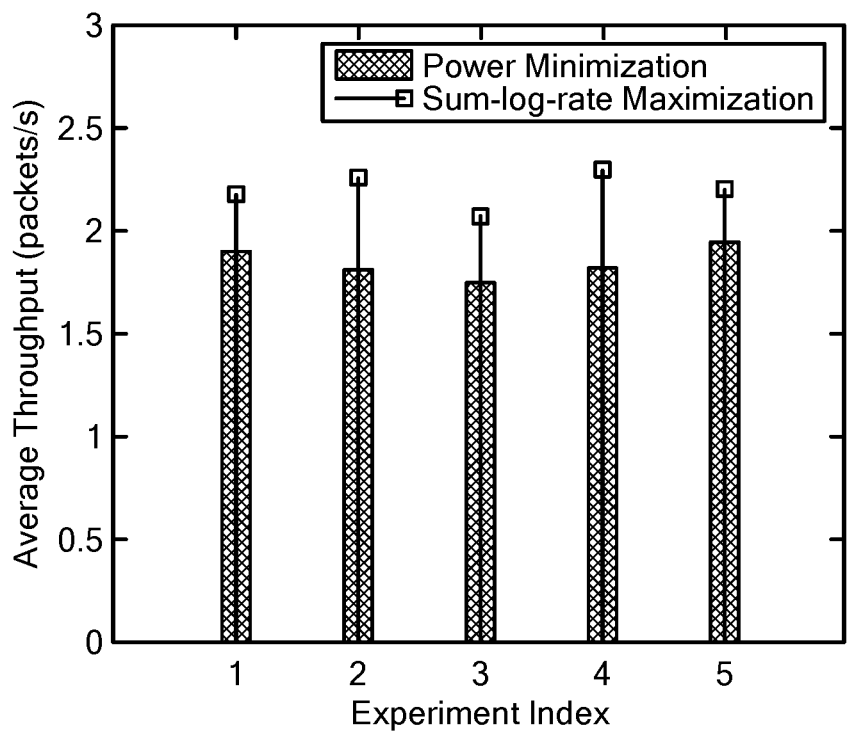
FIG. 14B is a graph of throughput for two different control objectives: sum-log-rate maximization and power minimization.

The measured average transmission power of the source and intermediate nodes are plotted in FIG. 14A, while the achievable throughput is reported in FIG. 14B. The two control objectives result in different network behaviors. With power minimization, the three sessions achieved approximately the target throughput (packets/s) with much lower average power than sum-log-rate maximization; while the latter achieves higher throughput at the cost of higher power consumption.

Figure 15A:
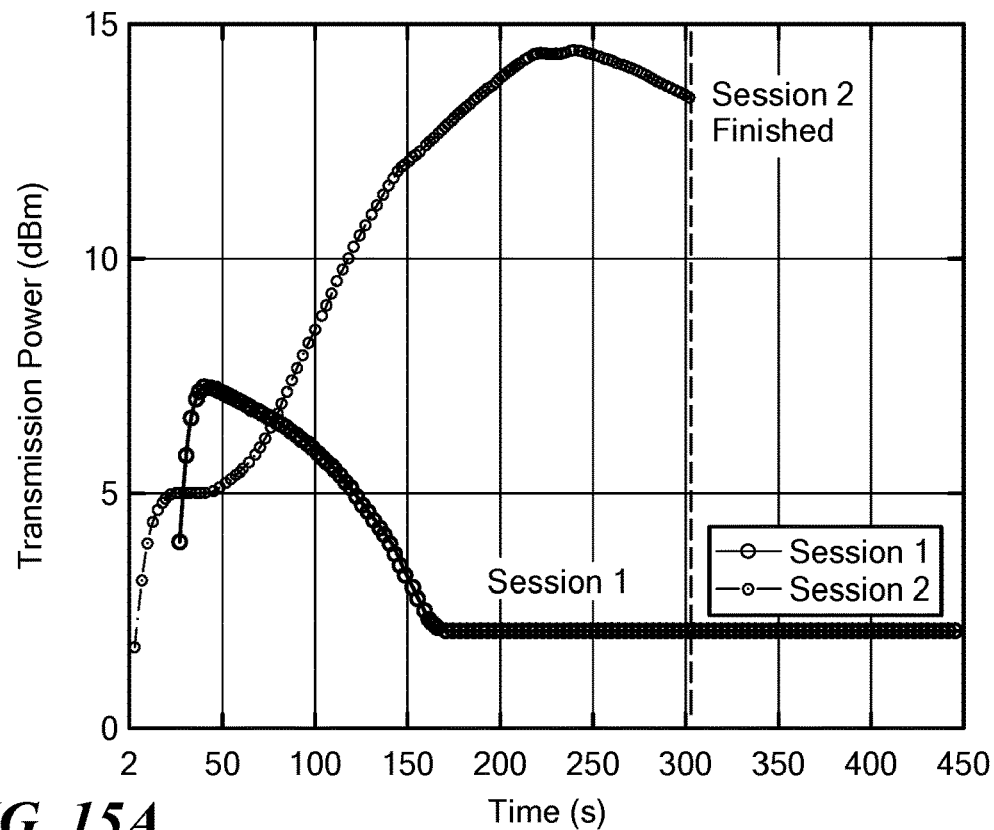
FIG. 15A is a graph of an instance of transmission power (source node) for sessions 1 and 2.
Figure 15B:
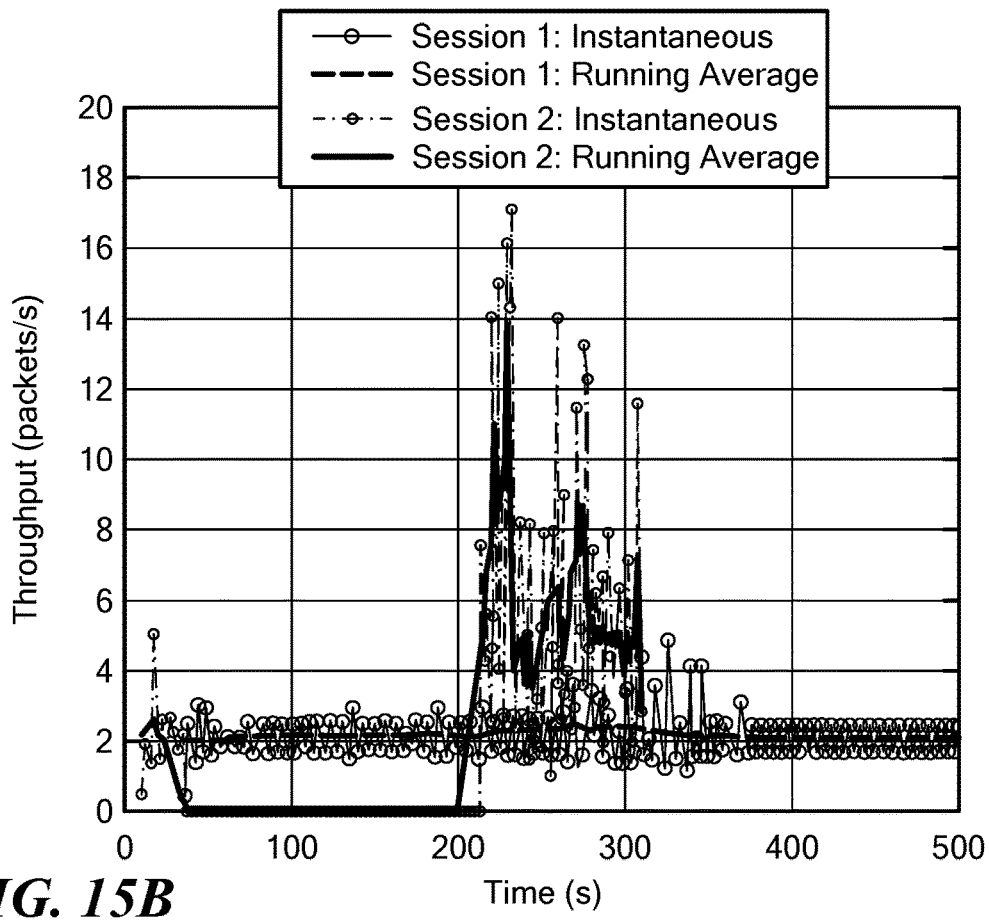
FIG. 15B is a graph of an instance of throughput resulting from power minimization for Sessions 1 and 2.
Figure 16A:
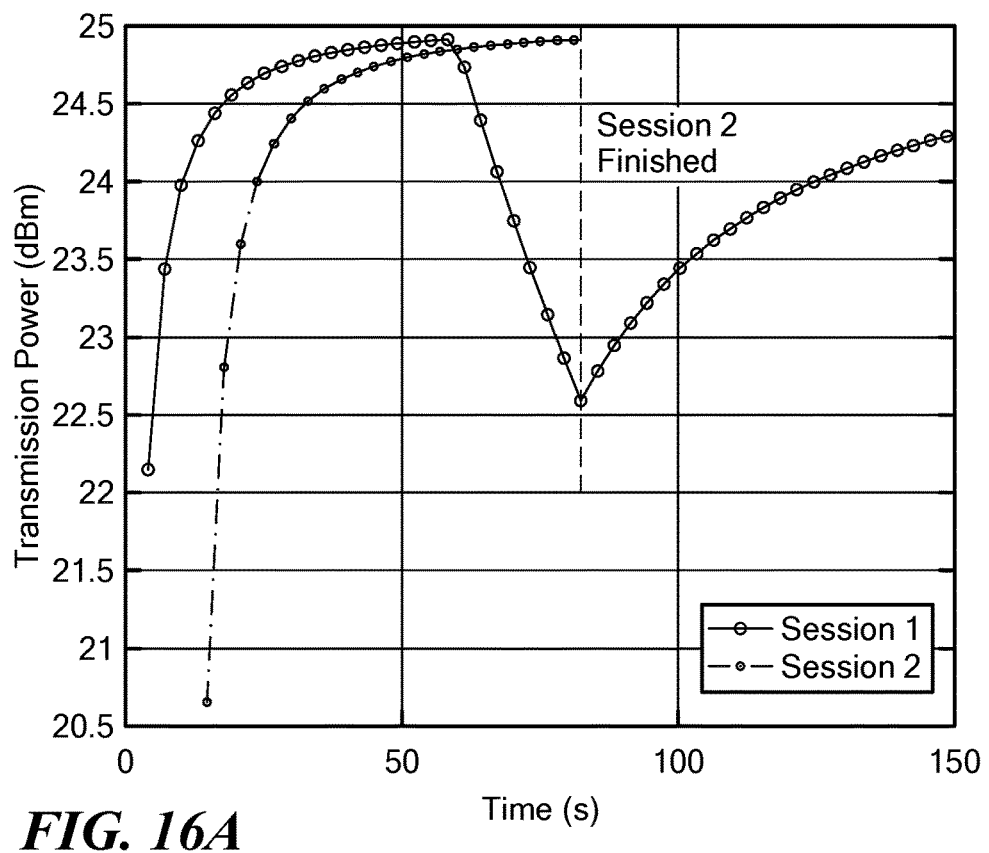
FIG. 16A is a graph of an instance of transmission power (source node) for sessions 1 and 2.
Figure 16B:
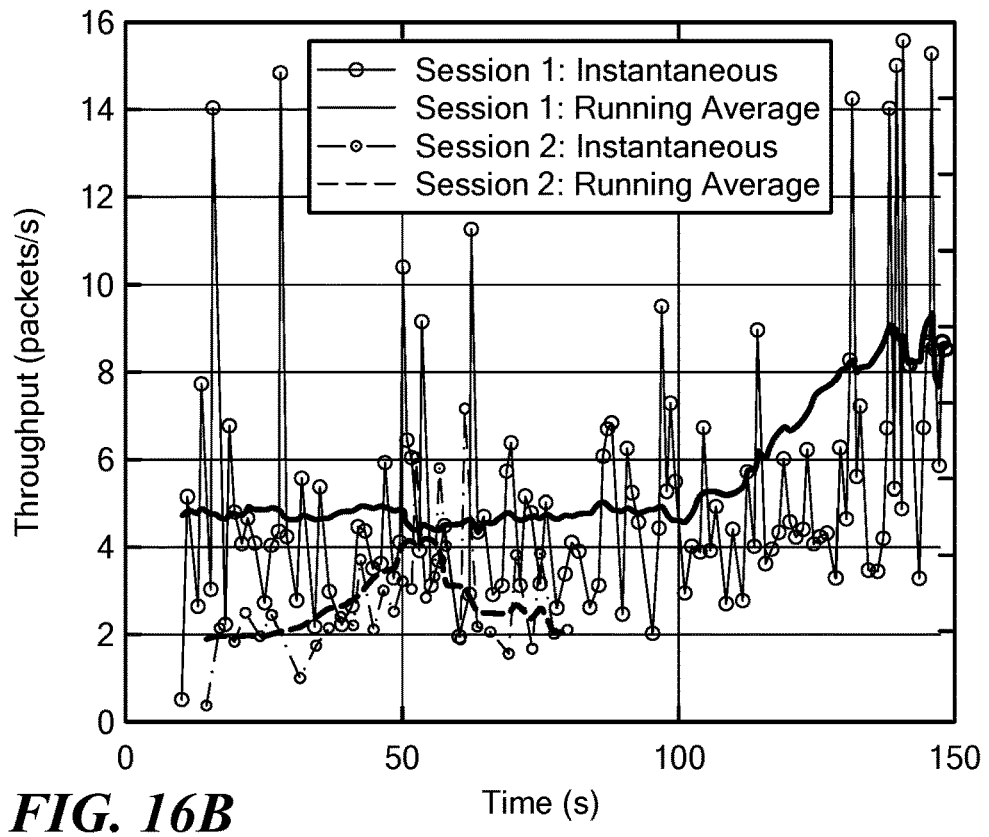
FIG. 16B is a graph of an instance of throughput resulting from sum-log-rate maximization for sessions 1 and 2.

FIGS. 15 and 16 provide a closer look at the contrasting network behaviors resulting from the two control objectives, respectively, by plotting the interactions between sessions 1 and 2 in terms of transmission power and the corresponding instantaneous throughputs. It can be seen from FIG. 15 that the running average throughput of session 2 decreased to zero during 20-200s because of low SINR. In response, session 2 increased its transmission power while session 1 decreased until session 2 recovered at around 200s. After session 2 finished, session 1 kept its then-current transmission power, which was sufficient to achieve the target throughput. Very differently, in the case of sum-log-rate maximization, after session 2 was done, session 1 increased its transmission power to maximize the throughput, as shown in FIG. 16.

While the PPS has been described in conjunction with software defined radios, in some embodiments, the PPS can be designed to operate on legacy wireless interface cards (e.g., WiFi). In some embodiments, WINOS can be extended to build mathematical models for user-defined network control problems by online learning and automated modeling.

Network protocols at different layers operate at different time scales, which can be up to orders-of-magnitude different. In the WINOS implementation described above, static time scales have been considered, e.g., 30 times larger for transport-layer rate adaptation than physical-layer power control in the testbed evaluation in Section 6. In some embodiments, WINOS can determine time scales automatically for different protocols based on the user-defined high-level network control objective, including convergence and delay requirements, network size, as well as the underlying transmission medium.

In the embodiments described above, dual decomposition and decomposition by partial linearization (DPL) have been considered for cross-layer and distributed decompositions, respectively. In some embodiments, other decomposition approaches, such as primal decomposition, hybrid dual and primal decompositions, can be incorporated.

Embodiments of the wireless network operating system described herein can be implemented on any suitable computer system that executes programming to carry out the operations and functions described herein. The computer system can be implemented as or can include a computing device that includes a combination of hardware, software, and firmware that allows the computing device to run an applications layer or otherwise perform various processing tasks. Computing devices can include without limitation personal computers, work stations, servers, laptop computers, tablet computers, mobile devices, hand-held devices, wireless devices, smartphones, wearable devices, embedded devices, microprocessor-based devices, microcontroller-based devices, programmable consumer electronics, minicomputers, main frame computers, and the like.

The computing device can include a basic input/output system (BIOS) and an operating system as software to manage hardware components, coordinate the interface between hardware and software, and manage basic operations such as start up. The computing device can include one or more processors and memory that cooperate with the operating system to provide basic functionality for the computing device. The operating system provides support functionality for the applications layer and other processing tasks. The computing device can include a system bus or other bus (such as memory bus, local bus, peripheral bus, and the like) for providing communication between the various hardware, software, and firmware components and with any external devices. Any type of architecture or infrastructure that allows the components to communicate and interact with each other can be used.

Processing tasks can be carried out by one or more processors. Various types of processing technology can be used, including a single processor or multiple processors, a central processing unit (CPU), multicore processors, parallel processors, or distributed processors. Additional specialized processing resources such as graphics (e.g., a graphics processing unit or GPU), video, multimedia, or mathematical processing capabilities can be provided to perform certain processing tasks. Processing tasks can be implemented with computer-executable instructions, such as application programs or other program modules, executed by the computing device. Application programs and program modules can include routines, subroutines, programs, scripts, drivers, objects, components, data structures, and the like that perform particular tasks or operate on data.

Processors can include one or more logic devices, such as small-scale integrated circuits, programmable logic arrays, programmable logic devices, masked-programmed gate arrays, field programmable gate arrays (FPGAs), application specific integrated circuits (ASICs), and complex programmable logic devices (CPLDs). Logic devices can include, without limitation, arithmetic logic blocks and operators, registers, finite state machines, multiplexers, accumulators, comparators, counters, look-up tables, gates, latches, flip-flops, input and output ports, carry in and carry out ports, and parity generators, and interconnection resources for logic blocks, logic units and logic cells.

The computing device includes memory or storage, which can be accessed by the system bus or in any other manner. Memory can store control logic, instructions, and/or data. Memory can include transitory memory, such as cache memory, random access memory (RAM), static random access memory (SRAM), main memory, dynamic random access memory (DRAM), and memristor memory cells. Memory can include storage for firmware or microcode, such as programmable read only memory (PROM) and erasable programmable read only memory (EPROM). Memory can include non-transitory or nonvolatile or persistent memory such as read only memory (ROM), one time programmable non-volatile memory (OTPNVM), hard disk drives, optical storage devices, compact disc drives, flash drives, floppy disk drives, magnetic tape drives, memory chips, and memristor memory cells. Non-transitory memory can be provided on a removable storage device. A computer-readable medium can include any physical medium that is capable of encoding instructions and/or storing data that can be subsequently used by a processor to implement embodiments of the method and system described herein. Physical media can include floppy discs, optical discs, CDs, mini-CDs, DVDs, HD-DVDs, Blu-ray discs, hard drives, tape drives, flash memory, or memory chips. Any other type of tangible, non-transitory storage that can provide instructions and/or data to a processor can be used in these embodiments.

The computing device can include one or more input/output interfaces for connecting input and output devices to various other components of the computing device. Input and output devices can include, without limitation, keyboards, mice, joysticks, microphones, cameras, webcams, displays, touchscreens, monitors, scanners, speakers, and printers. Interfaces can include universal serial bus (USB) ports, serial ports, parallel ports, game ports, and the like.

The computing device can access a network over a network connection that provides the computing device with telecommunications capabilities. Network connection enables the computing device to communicate and interact with any combination of remote devices, remote networks, and remote entities via a communications link. The communications link can be any type of communication link and can include any combination of tactical ad hoc networks, mesh networks, sensor networks, device-to-device networks, internet of things networks, intranets, local area networks (LANs), enterprise-wide networks, medium area networks, wide area networks (WANs), the Internet, cellular networks, and the like. Control logic and/or data can be transmitted to and from the computing device via the network connection. The network connection can include a modem, a network interface (such as an Ethernet card), a communication port, a PCMCIA slot and card, or the like to enable transmission of and receipt of data via the communications link.

The computing device can include a browser and a display that allow a user to browse and view pages or other content served by a web server over the communications link. A web server, server, and database can be located at the same or at different locations and can be part of the same computing device, different computing devices, or distributed across a network. A data center can be located at a remote location and accessed by the computing device over a network.

The computer system can include architecture distributed over one or more networks, such as, for example, a cloud computing architecture. Cloud computing includes without limitation distributed network architectures for providing, for example, software as a service (SaaS), infrastructure as a service (IaaS), platform as a service (PaaS), network as a service (NaaS), data as a service (DaaS), database as a service (DBaaS), desktop as a service (DaaS), backend as a service (BaaS), test environment as a service (TEaaS), API as a service (APIaaS), and integration platform as a service (IPaaS).

As used herein, "consisting essentially of" allows the inclusion of materials or steps that do not materially affect the basic and novel characteristics of the claim. Any recitation herein of the term "comprising," particularly in a description of components of a composition or in a description of elements of a device, can be exchanged with "consisting essentially of" or "consisting of."

It will be appreciated that the various features of the embodiments described herein can be combined in a variety of ways. For example, a feature described in conjunction with one embodiment may be included in another embodiment even if not explicitly described in conjunction with that embodiment.

To the extent that the appended claims have been drafted without multiple dependencies, this has been done only to accommodate formal requirements in jurisdictions which do not allow such multiple dependencies. It should be noted that all possible combinations of features which would be implied by rendering the claims multiply dependent are explicitly envisaged and should be considered part of the invention.

The present invention has been described in conjunction with certain preferred embodiments. It is to be understood that the invention is not limited to the exact details of construction, operation, exact materials or embodiments shown and described, and that various modifications, substitutions of equivalents, alterations to the compositions, and other changes to the embodiments disclosed herein will be apparent to one of skill in the art.

What is claimed is:

1. A wireless network operating system for communication between a plurality of nodes of a network, the operating system comprising:
　a system control host comprising one or more processors and memory, and machine-readable instructions stored in the memory that, upon execution by the one or more processors cause the system to carry out operations comprising:
　receiving an input comprising one or more network control objectives, one or more physical network constraints, and one or more network protocol parameters;

defining a network control problem comprising:
  a characterization of network behavior, the network behavior comprising the one or more network control objectives and the one or more physical network constraints, and
  the one or more network protocols;
decomposing the network control problem into a set of distributed subproblems, each subproblem characterizing a local behavior of a single session or a subset of sessions or a single node or a subset of nodes or a single protocol layer or a subset of protocol layers, to select a set of solution algorithms; and
sending the set of solution algorithms wirelessly to each node for execution at an associated node controller based on local state information at each node.

2. The system of claim 1, wherein defining the network control problem comprises:
providing a representation of network elements, the network elements comprising primitive elements and virtual elements, wherein:
  each of the primitive elements comprises an individual determined network entity, and
  each of the virtual elements comprises an undetermined set of network entities mappable to a set of determined primitive elements at runtime; and
determining inter-dependencies between the network elements, wherein the inter-dependencies comprise one or more (i) attributes characterizing relationships between the network elements, (ii) member relationships between the network elements, and (iii) functional relationships between the network elements.

3. The system of claim 2, wherein:
the primitive elements include one or more of a node, link, session, link capacity, and session rate; and
the virtual elements include one or more of neighbors of node, links of session, and sessions of link.

4. The system of claim 2, wherein defining the network control problem comprises performing one or more operations comprising:
setting network parameters of the network elements, wherein the network parameters include one or more of network architecture, spectrum access preferences, and routing preferences;
defining control variables by setting the network parameters as optimization variables;
defining a network utility by binding one or more mathematical expressions with mathematical operations, mathematical functions, or combination thereof; and
defining network constraints by comparing two or more of the mathematical expressions.

5. The system of claim 2, wherein decomposing the network control problem comprises determining a specific instance of the network control problem, the specific instance provided by determining a one-to-one mapping between each virtual element and an instance of each virtual element.

6. The system of claim 5, wherein determining the one-to-one mapping comprises peer sampling and hash checking.

7. The system of claim 5, wherein the virtual elements are categorized into global virtual elements and local virtual elements; and
determining the one-to-one mapping comprises:
  determining all instances for a same type of local virtual element having a same cardinality, and
  determining any sets of local virtual elements having an ordered uniqueness.

8. The system of claim 5, further comprising:
decomposing the specific instance of the network control problem into a set of single-layer subproblems each corresponding to a single protocol layer; and
further decomposing each single-layer subproblem into a set of local network control subproblems for solution at each network entity based on local network information.

9. The system of claim 8, wherein decomposing the network control problem into the set of single-layer subproblems comprises employing a cross-layer decomposition approach comprising a dual decomposition algorithm, a primal decomposition algorithm, and an indirect decomposition algorithm, or a combination thereof.

10. The system of claim 8, wherein further decomposing each single-layer subproblem into a set of local network control subproblems comprises determining a penalized utility function for each network entity.

11. The system of claim 1, wherein the system control host includes one or more numerical solvers operative to generate the set of solution algorithms to solve each of the sub-problems, wherein the numerical solvers include an interior point method, a sequential quadratic programming method, or a trust region reflective method.

12. The system of claim 1, wherein each node comprises one or more processors and memory, a programmable protocol stack stored in the memory, and machine-readable instructions stored in the memory operative to:
receive the set of solution algorithms and store the set of solution algorithms in a decision plane of the programmable protocol stack;
execute the solution algorithms at each protocol layer to optimize a penalized version of local control objectives; and
configure the protocol parameters for the node.

13. The system of claim 12, wherein the node is operative to determine the local state information, including one or more of noise level, interference power level, queue status, and available spectrum band.

14. The system of claim 12, further comprising a radio frequency transmitter at each node, the node controller operative to send control commands to the transmitter for transmission of RF signals based on the protocol parameters to other nodes in the network.

15. The system of claim 12, wherein the programmable protocol stack includes one or more of:
an application layer operative to open sessions between network entities, and including programmable parameters comprising one or more of a number of sessions, number of hops in a session, and behavior of a session;
a transport layer operative to implement data transfer between network entities, and including programmable parameters comprising one or more of a transmission rate, sliding window size, and packet size;
a network layer operative to provide one or more of host addressing, host identification, and packet routing, and including programmable parameters comprising routing strategies;
a datalink layer operative to implement one or more of fragmentation, defragmentation, encapsulation, network to physical address translation, padding, point-to-point frame delivery, logical link control, and medium access control, and including programmable parameters comprising one or more of channel coding rate, retransmission times, and packet error rate; and
a physical layer operative to implement point-to-point bit-level data transmission, and including programmable parameters comprising one or more of a modulation scheme, transmission power, frequency channel, and receiver gain.

16. The system of claim 1, wherein:
the one or more network control objectives include throughput maximization, energy efficiency maximization, delay minimization, or a combination thereof;
the one or more physical network constraints include maximum transmission power of each node, available spectrum bandwidth, maximum end-to-end delay, or a combination thereof; or
the network protocols include parameters optimizable in real time, including deterministic scheduling, stochastic scheduling, proactive routing, reactive routing, hybrid routing, delay-based congestion control, packet-loss-based congestion control, or a combination thereof.

17. A method of providing the wireless network operating system of claim 1, comprising:
providing the system control host;
providing an input to the system control host comprising the one or more network control objectives, the one or more physical network constraints, and the one or more network protocol parameters.

18. A network device for use at a node in a wireless network, comprising:
a radio frequency transmitter; and
a node controller comprising one or more processors and memory, a programmable protocol stack stored in the memory, and machine-readable instructions stored in the memory operative to:
receive a set of solution algorithms and store the set of solution algorithms in a decision plane of the programmable protocol stack;
execute the solution algorithms at each protocol layer to optimize a penalized version of local control objectives;
configure the protocol parameters for the node; and
send control commands to the radio frequency transmitter for transmission of RF signals based on the protocol parameters to other nodes in the network.

19. A method of wirelessly communicating between a plurality of nodes in a network, comprising:
at a system control host:
receiving an input comprising one or more network control objectives, one or more physical network constraints, and one or more network protocol parameters,
defining a network control problem comprising:
a characterization of network behavior, the network behavior comprising the one or more network control objectives and the one or more physical network constraints, and
the one or more network protocols,
decomposing the network control problem into a set of distributed subproblems, each subproblem characterizing a local behavior of a single session or a subset of sessions or a single node or a subset of nodes or a single protocol layer or a subset of protocol layers, to generate a set of solution algorithms, and
sending the set of solution algorithms to each node for execution at an associated node controller based on local state information at each node; and
at one or more nodes:
receiving a set of solution algorithms and store the set of solution algorithms in a decision plane of the programmable protocol stack,
executing the solution algorithms at each protocol layer to optimize a penalized version of local control objectives,
configuring the protocol parameters for the node, and
sending control commands to a radio frequency transmitter for transmission of RF signals based on the protocol parameters to other nodes in the network.

* * * * *